US012661664B2

(12) United States Patent
Quaile et al.

(10) Patent No.: US 12,661,664 B2
(45) Date of Patent: Jun. 23, 2026

(54) IN-LINE DEBRIS SEPARATOR FOR LIQUID

(71) Applicant: Eaton Intelligent Power Limited, Dublin (IE)

(72) Inventors: William Charles Quaile, West Chester, PA (US); John Joseph Zielinski, Southampton, PA (US); Xin Pu, Chester Springs, PA (US); Scott T. Armstrong, Oxford, PA (US)

(73) Assignee: Eaton Intelligent Power Limited, Dublin (IE)

( * ) Notice: Subject to any disclaimer, the term of this patent is extended or adjusted under 35 U.S.C. 154(b) by 195 days.

(21) Appl. No.: 18/046,724

(22) Filed: Oct. 14, 2022

(65) Prior Publication Data

US 2023/0117200 A1 Apr. 20, 2023

Related U.S. Application Data

(60) Provisional application No. 63/255,751, filed on Oct. 14, 2021.

(51) Int. Cl.
*B04C 3/06* (2006.01)
*B04C 3/00* (2006.01)

(52) U.S. Cl.
CPC .......... *B04C 3/06* (2013.01); *B04C 2003/006* (2013.01)

(58) Field of Classification Search
CPC ...... B04C 3/06; B04C 2003/006; B01D 45/16
See application file for complete search history.

(56) References Cited

U.S. PATENT DOCUMENTS 1,360,349 A * 11/1920 Wright ...................... B04C 3/00 55/448
1,931,193 A * 10/1933 Hawley ..................... B04C 3/00 55/396
3,394,533 A * 7/1968 Sheng .................... B01D 53/26 55/438
3,641,745 A 2/1972 Moore
3,893,914 A * 7/1975 Bobo ........................ B04C 7/00 209/733
4,179,273 A * 12/1979 Montusi ............... B01D 21/265 210/512.1

(Continued)

FOREIGN PATENT DOCUMENTS

GB 1310792 A 3/1973

OTHER PUBLICATIONS

Eaton-lubriclone-ds200-34b-datasheet-en-us.

(Continued)

*Primary Examiner* — Dung H Bui
(74) *Attorney, Agent, or Firm* — Merchant & Gould P.C.

(57) ABSTRACT

A flow separator includes a flow swirling arrangement and a particle collection space disposed in-line with an inlet and an outlet of a flow separator. The flow swirling arrangement includes a bladed arrangement disposed around a flow diverter. The particle collection space is an annular space disposed at an opposite end of a swirl region from the flow swirling arrangement. The annular space is disposed at the radially outward-most portion of the flow passage to collect particles via centrifugal force. A gas conduit may extend from the flow diverter through the particle collection space to separate out gas from the liquid of the input flow.

31 Claims, 21 Drawing Sheets

(56) References Cited

U.S. PATENT DOCUMENTS

| | | | | | |
|---|---|---|---|---|---|
| 4,311,494 | A * | 1/1982 | Conner | F02M 35/022 | 55/394 |
| 4,971,603 | A * | 11/1990 | Prinsloo | B04C 3/00 | 55/345 |
| 5,028,318 | A * | 7/1991 | Aslin | B01D 21/34 | 95/271 |
| 5,178,656 | A * | 1/1993 | Schott | B04C 3/06 | 55/463 |
| 5,403,367 | A * | 4/1995 | De Villiers | B01D 45/16 | 55/320 |
| 6,083,291 | A * | 7/2000 | Okada | B01D 45/12 | 55/455 |
| 6,348,087 | B1 * | 2/2002 | Aslin | B01D 19/0057 | 96/216 |
| 6,350,292 | B1 * | 2/2002 | Lee | B01D 45/16 | 55/463 |
| 6,540,802 | B2 * | 4/2003 | Trautmann | F02M 35/168 | 55/432 |
| 6,540,917 | B1 * | 4/2003 | Rachels | B04C 3/06 | 210/512.1 |
| 6,752,845 | B2 * | 6/2004 | Haland | B04C 3/06 | 55/433 |
| 6,921,424 | B2 * | 7/2005 | Bugli | B01D 45/16 | 55/412 |
| 7,070,637 | B1 | 7/2006 | Zhang | | |
| 7,156,889 | B1 * | 1/2007 | Swanson | B01D 46/62 | 55/467 |
| 7,288,139 | B1 | 10/2007 | Showalter | | |
| 8,945,283 | B1 * | 2/2015 | Krishnamurthy | B01D 45/16 | 95/271 |
| 9,101,869 | B2 | 8/2015 | Mueller | | |
| 9,764,265 | B2 | 9/2017 | Mueller | | |
| 10,254,210 | B2 | 4/2019 | Weiser | | |
| 10,434,523 | B2 | 10/2019 | Santeler et al. | | |
| 10,569,198 | B2 | 2/2020 | Kulkarni et al. | | |
| 10,688,504 | B2 * | 6/2020 | Krishnamurthy | B01D 45/14 | |
| 10,710,013 | B2 | 7/2020 | Mueller | | |
| 11,117,143 | B2 * | 9/2021 | Son | B04C 3/00 | |
| 2002/0088347 | A1 * | 7/2002 | Kinsel | B01D 53/26 | 55/455 |
| 2003/0159412 | A1 | 8/2003 | North | | |
| 2004/0025481 | A1 * | 2/2004 | Bugli | B01D 45/16 | 55/455 |
| 2007/0201604 | A1 * | 8/2007 | Chaki | B04C 3/00 | 376/301 |
| 2007/0251383 | A1 | 11/2007 | Mueller | | |
| 2012/0103423 | A1 * | 5/2012 | Schook | B04C 3/00 | 137/1 |
| 2014/0299540 | A1 * | 10/2014 | Ackermann | B01D 21/26 | 210/512.3 |
| 2015/0290560 | A1 * | 10/2015 | Høydal | B01D 19/0042 | 95/243 |
| 2015/0306528 | A1 * | 10/2015 | Mueller | B04C 3/06 | 55/338 |
| 2016/0008752 | A1 * | 1/2016 | McKenzie | B01D 45/16 | 55/456 |
| 2016/0047342 | A1 * | 2/2016 | Kraxner | F02M 35/0201 | 55/442 |
| 2016/0206169 | A1 * | 7/2016 | Hyun | B04C 5/28 | |
| 2017/0065986 | A1 * | 3/2017 | Goulds | F02C 7/222 | |
| 2017/0333918 | A1 | 11/2017 | Hua et al. | | |
| 2018/0369731 | A1 | 12/2018 | Mueller | | |
| 2019/0128788 | A1 | 5/2019 | Gerardi et al. | | |
| 2020/0070079 | A1 * | 3/2020 | Son | B01D 45/16 | |
| 2020/0164388 | A1 * | 5/2020 | Bayrakci | B04C 3/06 | |
| 2021/0239508 | A1 | 8/2021 | Kopansky et al. | | |
| 2021/0291095 | A1 * | 9/2021 | Peterson | B01D 5/0021 | |

OTHER PUBLICATIONS

QDM Debris Monitoring System Brochure Apr. 1996.

Extended European Search Report issued in corresponding European Patent Application No. 22201531.5, Mar. 1, 2023.

* cited by examiner

IN-LINE DEBRIS SEPARATOR FOR LIQUID

CROSS-REFERENCE TO RELATED APPLICATION

This application claims the benefit of U.S. Provisional Patent Application No. 63/255,751, filed Oct. 14, 2021. The disclosure of the priority application in its entirety is hereby incorporated by reference into the presence application.

BACKGROUND

Debris monitoring is used to detect the presence of wear particles in lubricating oils that may be transferred from the oil-wetted surfaces of gears and bearings under mechanical distress. Automatic debris monitoring is preferred by maintainers as it eliminates the need to do routine inspections and preempts the potential catastrophic failure should it advance faster than the inspection interval. Air separation in a lubricating system is used when the design of the oil tank and flow rate inhibits adequate de-aeration in the tank. Proper de-aeration is useful in a lubrication system to inhibit damage to supply pump and to ensure proper lubrication of oil wetted surfaces. When the system design allows, the combination of de-aeration and particle separation saves on weight and overall fuel efficiency of the engine.

A debris separator apparatus separates the debris particles from the oil or other liquid received at the inlet. In certain cases, the debris separator also may separate out air or other gases from the oil or other liquid. A pocket is provided adjacent the outlet of the separator to receive the debris particles that become separated from the mixture. A sensor may be provided at the pocket to detect the presence of the particle debris.

SUMMARY

Aspects of the disclosure are directed to a flow separator and methods of use thereof. A flow of liquid is input into the flow separator at an inlet. For example, the flow separator may be disposed along a lubrication system of an engine so that oil is input into the flow separator. The flow of liquid may contain particles. For example, if an engine component upstream of the flow separator is damaged or worn, particles from the engine component may be carried by the liquid flow to the flow separator. Within the flow separator, any particles of a certain size or mass may be separated from the liquid. A sensor may be mounted to the flow separator to detect the presence of such particles, thereby indicating potential damage or wear to upstream engine components.

In certain implementations, the flow separator is an in-line separator that provides a small, simple envelope. The in-line separator may easily be installed along a conduit of a lubrication system without the need to redirect flow along a transverse direction or place the in-line separator at bends in the system. Accordingly, lubrication designers are able to place debris monitoring at optimal locations with minimal impact to interface design on other lube system components.

In certain implementations, the flow of liquid input into the flow separator may be aerated. In certain such implementations, the gas (e.g., air) may be separated from the liquid (e.g., oil).

In accordance with some aspects of the disclosure, the flow separator includes a flow diverter disposed along a flow path so that the flow diverter is in-line with an inlet and an outlet of the flow separator. A bladed arrangement causes swirling of the flow around the flow diverter. Centrifugal force pushes the particles (e.g., particles of a particular size or mass) to the inner wall of the flow separator while the liquid swirls radially inwardly from the inner walls. A particle collection space is disposed along the inner wall. A barrier wall demarcates the particle collection space from a remainder of the flow passage. The barrier wall is sized and positioned to trap particles of a desired size or mass within the particle collection space while allowing the liquid to flow through a passage defined by the barrier wall to the outlet of the flow separator.

In certain examples, the flow diverter is conically shaped or trumpet shaped.

In certain examples, the flow diverter has a hollow interior facing the outlet.

In certain examples, the bladed arrangement includes a plurality of blades overlapping along the flow path to define a helical flow passage.

In certain implementations, the flow diverter cooperates with a housing of the flow separator to form narrow gaps through which the fluid flows past the flow diverter and into a swirl region. In certain examples, the gaps extend between the flow diverter and the housing by a distance that is less than 25% of a transverse cross-dimension of the inlet of the flow separator. In certain examples, the gaps extend between the flow diverter and the housing by a distance that is less than 15% of a transverse cross-dimension of the inlet of the flow separator. In certain examples, the gaps extend between the flow diverter and the housing by a distance that is less than 10% of a transverse cross-dimension of the inlet of the flow separator.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
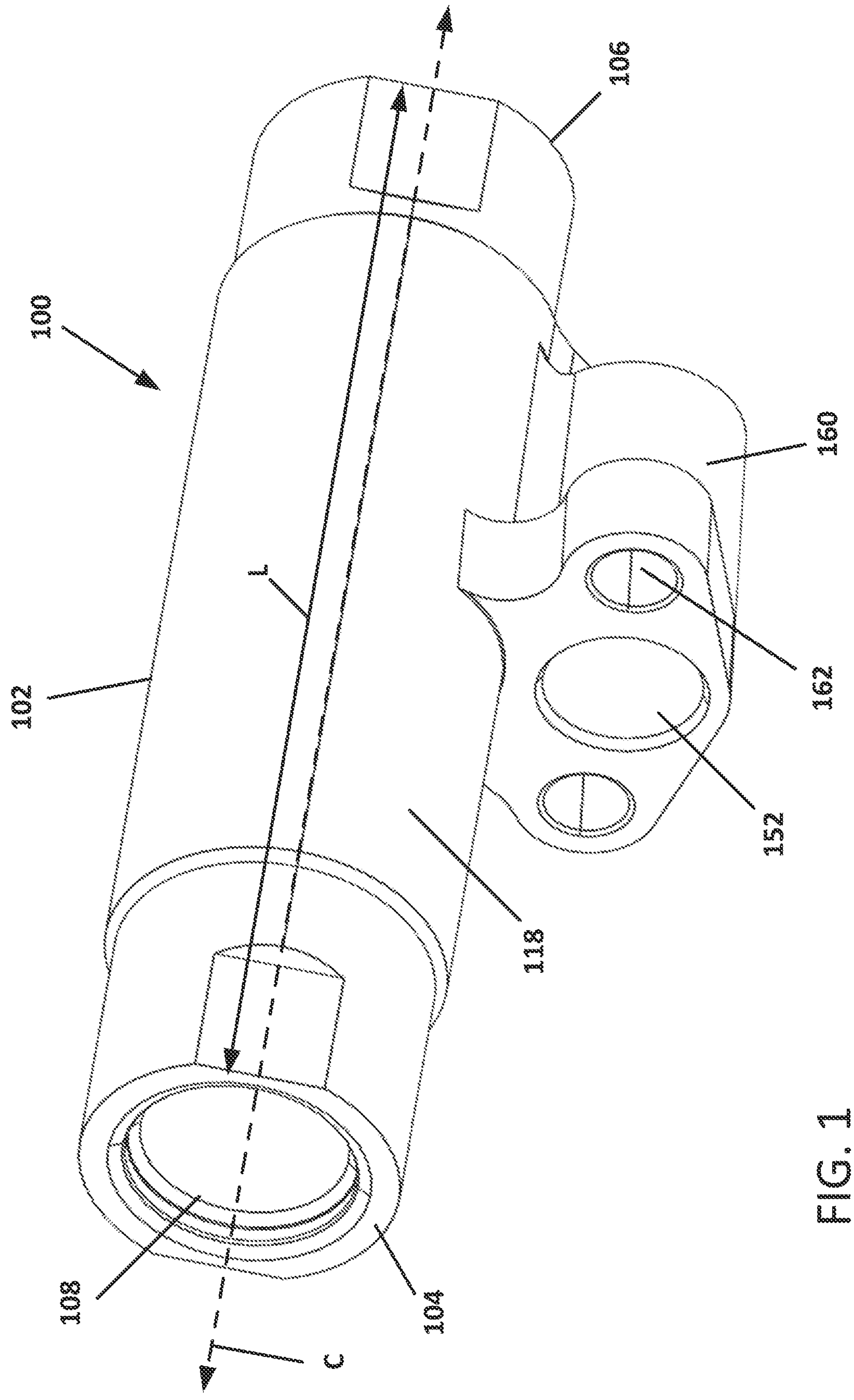
FIG. 1 is a perspective view of a first example flow separator configured in accordance with the principles of the present disclosure.
Figure 2:
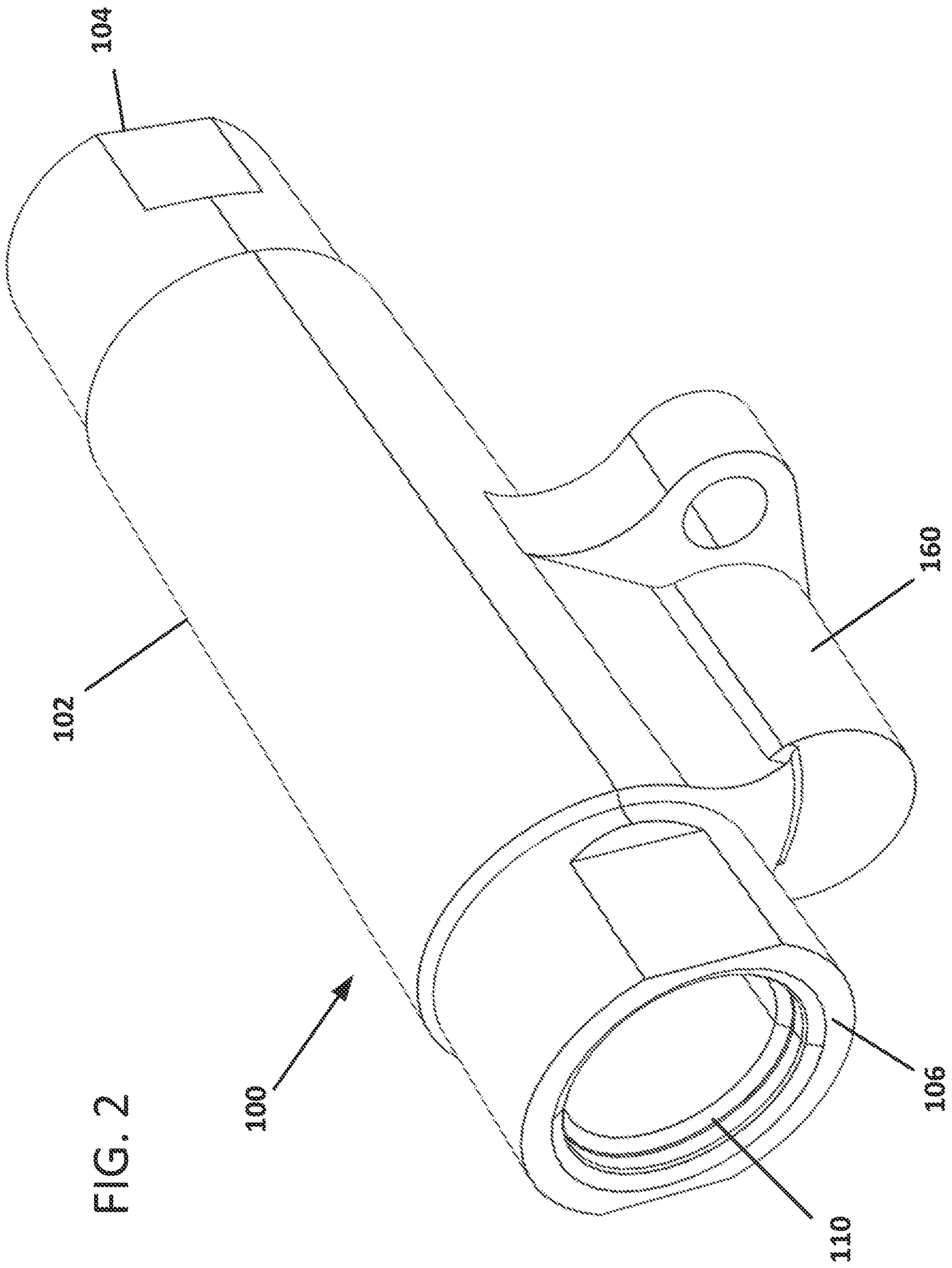
FIG. 2 is another perspective view of the first flow separator of FIG. 1.
Figure 3:
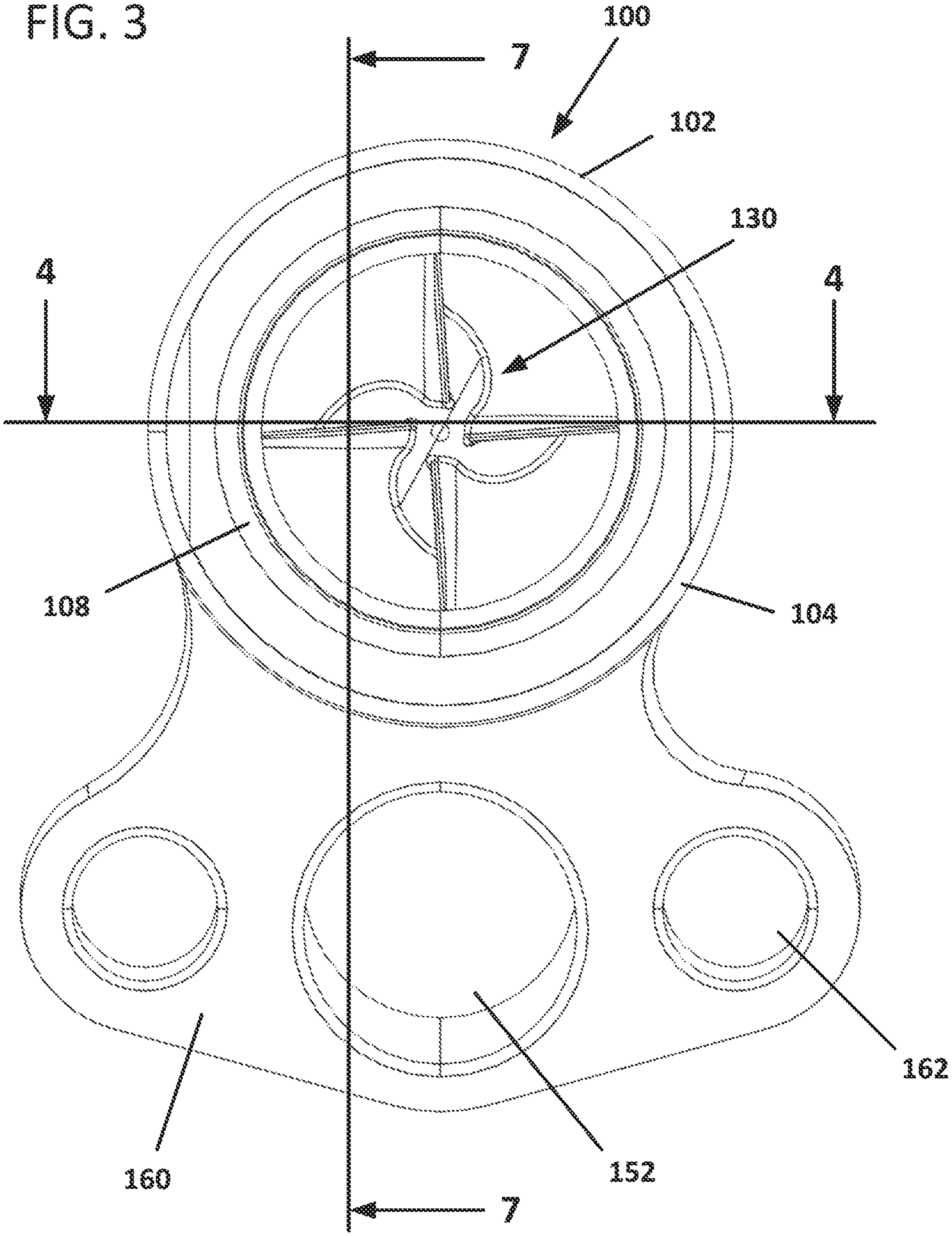
FIG. 3 is an end elevational view of the first flow separator of FIG. 1.
Figure 4:
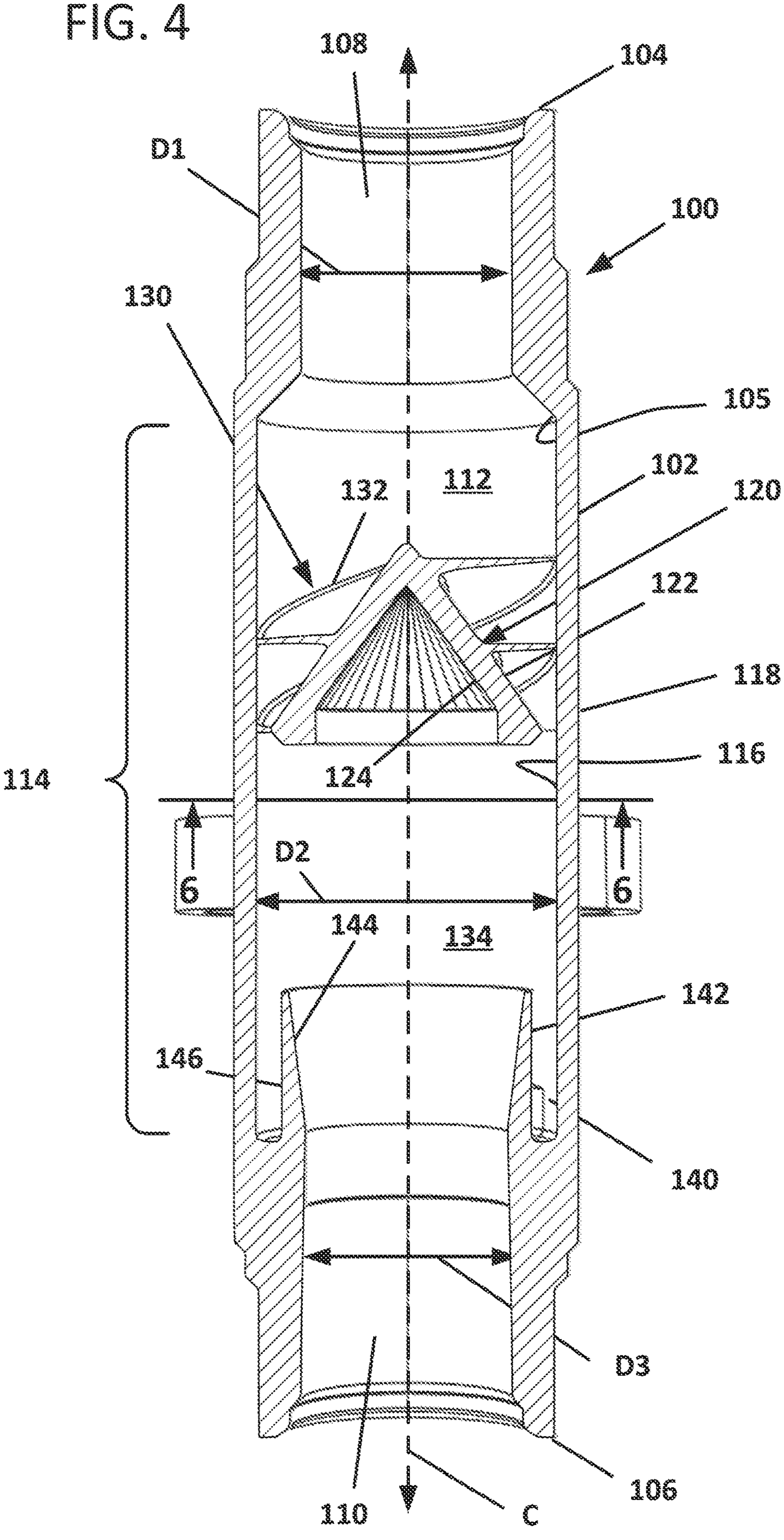
FIG. 4 is an axial cross-sectional view taken along the 4-4 line of FIG. 3.

Reference will now be made in detail to exemplary aspects of the present disclosure that are illustrated in the accompanying drawings. Wherever possible, the same reference numbers will be used throughout the drawings to refer to the same or like parts.

A flow separator 100, 200, 300 includes a separator housing 102, 202, 302 defines a central axis C. The separator housing 102, 202, 302 has a length L that extends along the central axis C between a first end 104, 204, 304 and a second end 106, 206 of the separator housing 102, 202, 302. The first end 104, 204, 304 of the separator housing 102, 202, 302 defines an inlet 108, 208, 308 of the separator housing 102, 202, 302 at which an input flow F enters the separator housing 102, 202, 302. Debris particles P are separated out from a liquid L of the input flow F within the separator housing 102, 202, 302 and directed to a collection tank 160, 260, 360 or sensor conduit 370. The liquid L exits the separator housing 102, 202, 302 through an outlet 110, 210, 310 defined at the second end 106, 206, 306 of the separator housing 102, 202, 302. In the flow separators 100, 300 shown in FIGS. 1-9 and 16, the liquid L may be aerated. In the flow separator 200 shown in FIGS. 10-15, air or other gases may be separated out from the liquid L as will be described in more detail herein.

The separator housing 102, 202, 302 defines a flow passage 112, 212, 312 that extends through the separator housing 102, 202, 302 along the central axis C from the inlet 108, 208, 308 to the outlet 110, 210, 310. The flow separator housing 102, 202, 302 includes a sidewall 118, 218 extending circumferentially around the central axis C.

The sidewall 118, 218 extends between the inlet 108, 208, 308 and the outlet 110, 210, 310. The sidewall 118, 218 defines a main inner surface 116, 216 facing radially towards the central axis C to define the flow passage 112, 212, 312. In certain implementations, the inlet 108, 208, 308 and the outlet 110, 210, 310 define securement structure (e.g., threads, flanges, etc.) by which conduits or equipment may be mounted to the inlet 108, 208, 308 and/or the outlet 110, 210, 310.

An intermediate portion 114, 214 of the flow passage 112, 212, 312 is defined by a main inner surface 116, 216 of a sidewall 118, 218 of the separator housing 102, 202, 302 that surrounds the central axis C. The intermediate portion 114, 214 extends between the inlet 108, 208, 308 and the outlet 110, 210, 310. In some implementations, a transverse cross-dimension D2 of the intermediate portion 114, 214 is larger than a transverse cross-dimension D1 of the inlet 108, 208, 308. In other implementations, the transverse cross-dimension D2 of the intermediate portion 114, 214 is the same as the transverse cross-dimension D1 of the inlet 108, 208, 308. In some implementations, a transverse cross-dimension D2 of the intermediate portion 114, 214 is larger than a transverse cross-dimension D3 of the outlet 110, 210, 310. In other implementations, the transverse cross-dimension D2 of the intermediate portion 114, 214 is the same as the transverse cross-dimension D3 as the outlet 110, 210, 310. In certain examples, the separator housing 102, 202, 302 is formed by a straight pipe having a constant transverse cross-dimension. In certain examples, the transverse cross-dimensions D1, D3 of the inlet 108, 208, 308 and the outlet 110, 210, 310 are the same. In certain examples, the inlet 108, 208, 308 and the outlet 110, 210, 310 are co-axially aligned along the central axis C.

A flow diverter 120, 220, 320, 420, 520 is positioned along the flow passage 112, 212, 312. In some implementations, the separator housing 102, 202, 302 includes an expansion region 105, 205 (FIG. 4) upstream of the flow diverter 120, 220, 320, 420, 520 where an inner diameter for the flow passage 112, 212, 312 expands from the inlet transverse cross-dimension D1 to the enlarged transverse cross-dimension D2 of the intermediate portion 114, 214 of the flow passage 112, 212, 312. In other implementations, the separator housing 102, 202, 302 is formed by a pipe or other housing having a constant transverse cross-dimension. Other configurations are possible.

The flow diverter 120, 220, 320, 420, 520 extends along the central axis C between a first end 121, 221, 321, 421, 521 and an opposite second end 129, 229, 329, 429, 529. In certain examples, the flow diverter 120, 220, 320, 420, 520 is co-axially aligned with the central axis C. In certain implementations, the flow diverter 120, 220, 320, 420, 520 includes an outer surface 122, 222, 422, 522 that faces at least partially toward the inlet 108, 208, 308. The outer surface 122, 222, 422, 522 defines an outer diameter D4 (see FIG. 5) of the flow diverter 120, 220, 320, 420, 520 that enlarges as the outer surface 122, 222, 422, 522 extends toward the outlet 110, 210, 310 of the separator housing 102, 202, 302. In certain examples, the outer surface 122, 222, 422, 522 of the flow diverter 120 is spaced from the main inner surface 116, 216 of the sidewall 118, 218, 318 by a distance G (see FIGS. 5, 19, and 21) to allow flow past the flow diverter 120, 220, 420, 520 and into a swirl region 134, 234.

In certain examples, the distance G is between 1% and 25% of the transverse cross-dimension D1 of the inlet 108, 208, 308. In certain examples, the distance G is between 1% and 20% of the transverse cross-dimension D1 of the inlet 108, 208, 308. In certain examples, the distance G is between 1% and 15% of the transverse cross-dimension D1 of the inlet 108, 208, 308. In certain examples, the distance G is between 1% and 10% of the transverse cross-dimension D1 of the inlet 108, 208, 308. In certain examples, the distance G is between 2% and 15% of the transverse cross-dimension D1 of the inlet 108, 208, 308. In certain examples, the distance G is between 5% and 30% of the transverse cross-dimension D1 of the inlet 108, 208, 308. In certain examples, the distance G is between 5% and 25% of the transverse cross-dimension D1 of the inlet 108, 208, 308. In certain examples, the distance G is between 10% and 20% of the transverse cross-dimension D1 of the inlet 108, 208, 308. In certain examples, the distance G is between 5% and 20% of the transverse cross-dimension D1 of the inlet 108, 208, 308. In certain examples, the distance G is between 10% and 30% of the transverse cross-dimension D1 of the inlet 108, 208, 308.

In certain implementations, the flow diverter 120, 220, 320, 420, 520 includes a circumferential wall that expands outwardly as the flow diverter 120, 220, 320, 420, 520 extends downstream within the flow passage 112, 212, 312. In certain examples, the circumferential wall of the flow diverter 120, 220, 320, 420, 520 tapers outwardly at a constant rate (i.e., defines a straight line extending between the first end 121, 221, 321, 421, 521 and the second end 129, 229, 329, 429, 529. For example, the flow diverter 120, 220, 320 may have a conical shape (e.g., a full cone, a frustro-conical shape, etc.). In other examples, the circumferential wall has a convex curvature or a concave curvature (see FIGS. 19 and 21) as the wall extends between the first end 121, 221, 321, 421, 521 and the second end 129, 229, 329, 429, 529. For example, the circumferential wall may have a bell shape or a trumpet shape (see FIGS. 19 and 21).

In some implementations, the flow diverter 120, 220, 320 has a hollow interior defined by an inner surface 124, 224 that faces at least partially toward the outlet 110, 210, 310. The inner surface 124, 224 defines an inner diameter D5 of the flow diverter 120, 220, 320 that enlarges as the inner surface 124, 224 extends toward the outlet 110, 210, 310 of the separator housing 102, 202, 302. In certain examples, the flow diverter 120, 220, 320 has a conical shape so that the outer diameter D4 is an outer cone diameter and the inner diameter D5 is an inner cone diameter. In other examples, the flow diverter 120, 220, 320 may have other shapes (e.g., a bell shape, a trumpet shape, etc.). In certain examples, the shape of the inner surface 124, 224 does not match the shape of the outer surface 122, 222. In other implementations, the flow diverter 120, 220, 320 may be solid (i.e., not defining a hollow interior). In some examples, the second outer surface is flat. In other examples, the second outer surface includes a protrusion (e.g., a conical protrusion).

In certain implementations, the flow diverter 120, 220, 320 defines a second outer surface 125, 225, 325, 425, 525 facing towards the outlet 110, 210, 310. In certain examples, the second outer surface 125, 225, 325, 425, 525 tapers inwardly as the second outer surface 125, 225, 325, 425, 525 extends downstream towards the outlet 110, 210, 310. In certain examples, the second outer surface 125, 225, 325, 425, 525 extends away from a webbing or other attachment that holds the flow diverter 120, 220, 320, 420, 520 within the passage 112, 212, 312. In certain examples, the second outer surface 125, 225, 325, 425, 525 has a conical shape. In certain examples, the second outer surface 125, 225, 325 provides an entrance to the hollow interior of the flow diverter 120, 220, 320.

In certain implementations, a bladed arrangement 130, 230, 330, 430, 530 is disposed between the outer surface 122, 222, 422, 522 of the flow diverter 120, 220, 320, 420, 520 and the main inner surface 116, 216 of the sidewall 118, 218 of the separator housing 102, 202, 302 for causing flow moving through the flow passage 112, 212, 312 toward the outlet 110, 210, 310 to swirl about the central axis C. In certain implementations, the flow diverter 120, 220, 320, 420, 520 is mounted to the sidewall 118, 218 by the bladed arrangement 130, 230, 330, 430, 530 (e.g., see FIGS. 5, 6, and 18-21). In certain examples, the second outer wall 125, 225, 325, 425, 525 tapers inwardly as the second outer wall 125, 225, 325, 425, 525 extends downstream from the bladed arrangement 130, 230, 330, 430, 530. For example, each blade 132, 232, 332, 432, 532 may extend between the main inner surface 116, 216 of the sidewall 118, 218 and the outer surface 122, 222, 422, 522 of the flow diverter 120, 220, 320, 420, 520. In certain examples, the bladed arrangement 130, 230, 330, 430, 530 defines a helical flow path around the flow diverter 120, 220, 320, 420, 520. The bladed arrangement 130, 230, 330, 430, 530 include one or more blades 132, 232, 332, 432, 532 that direct the flow around the flow diverter 120, 220, 320, 420, 520. In some examples, the bladed arrangement 130, 230, 430, 530 includes multiple blades 132, 232, 332, 532 overlapping along the flow passage 112, 212, 312 between the inlet 108, 208, 308 and the outlet 110, 210, 310 (e.g., see FIGS. 3 and 5). In other examples, the blades 432 do not overlap along the flow passage 112, 212, 312.

Figure 5:
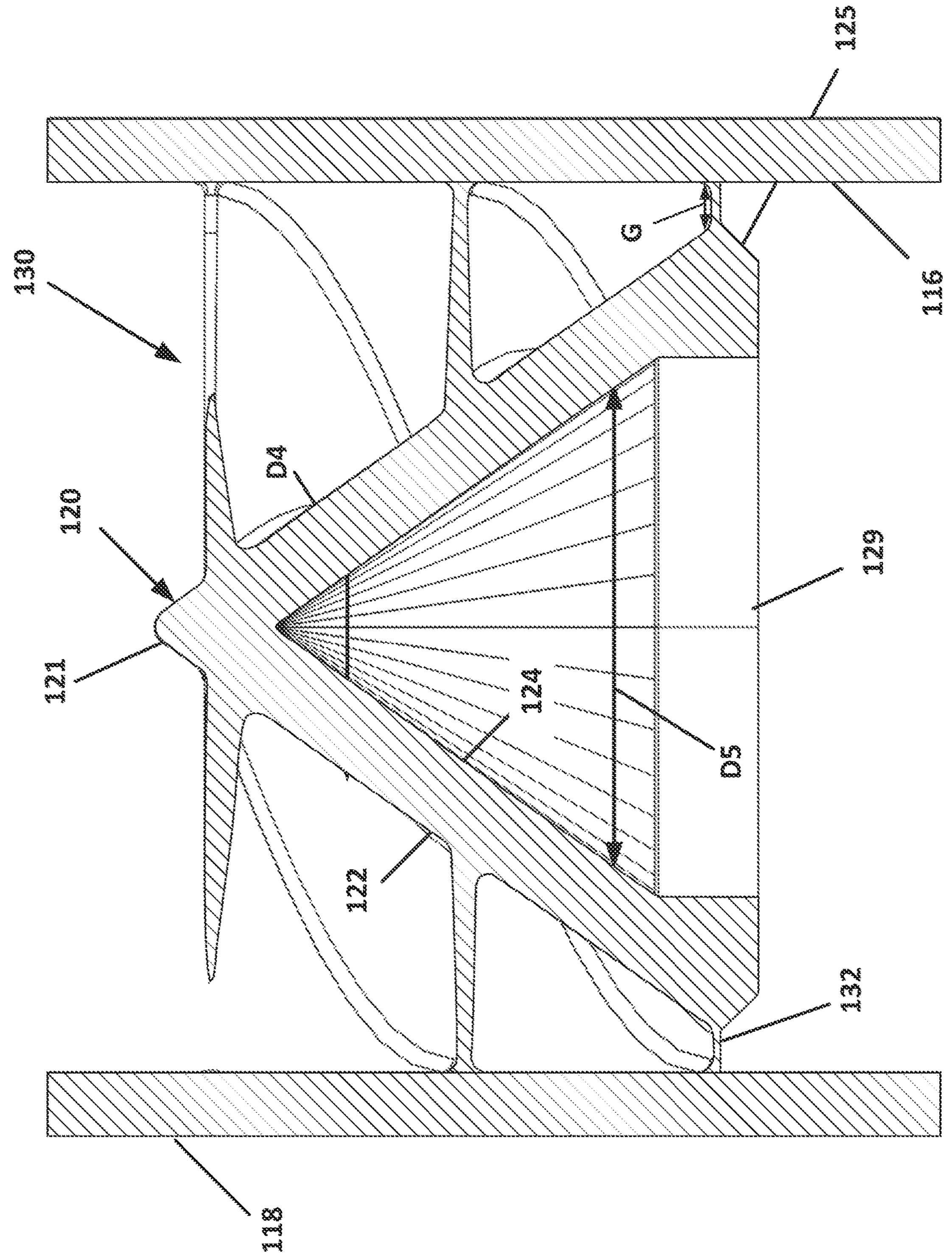
FIG. 5 is an enlarged view of a first example flow diverter and bladed arrangement of FIG. 4.
Figure 6:
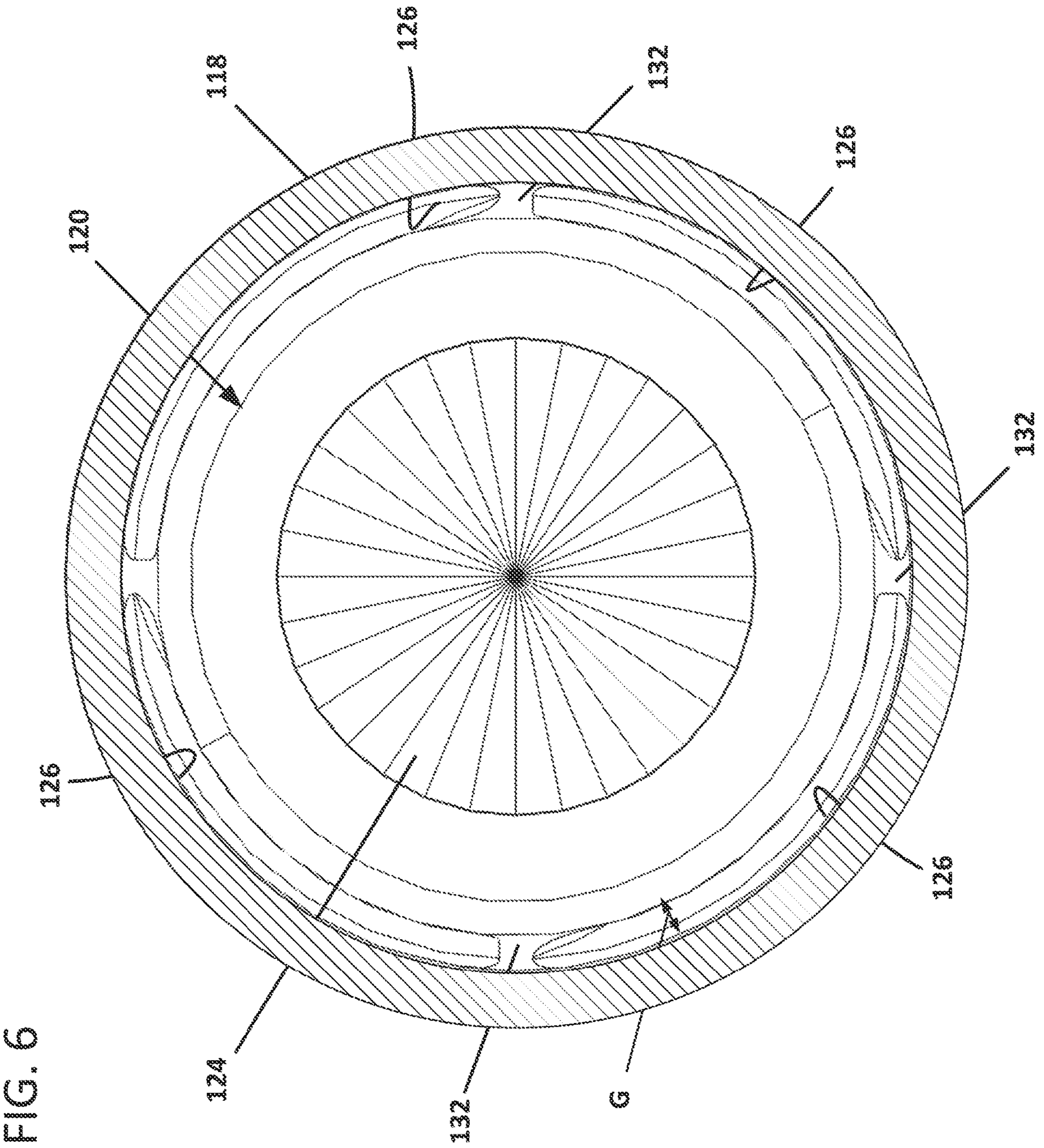
FIG. 6 is a transverse cross-sectional view taken along the 6-6 line of FIG. 4.
Figure 19:
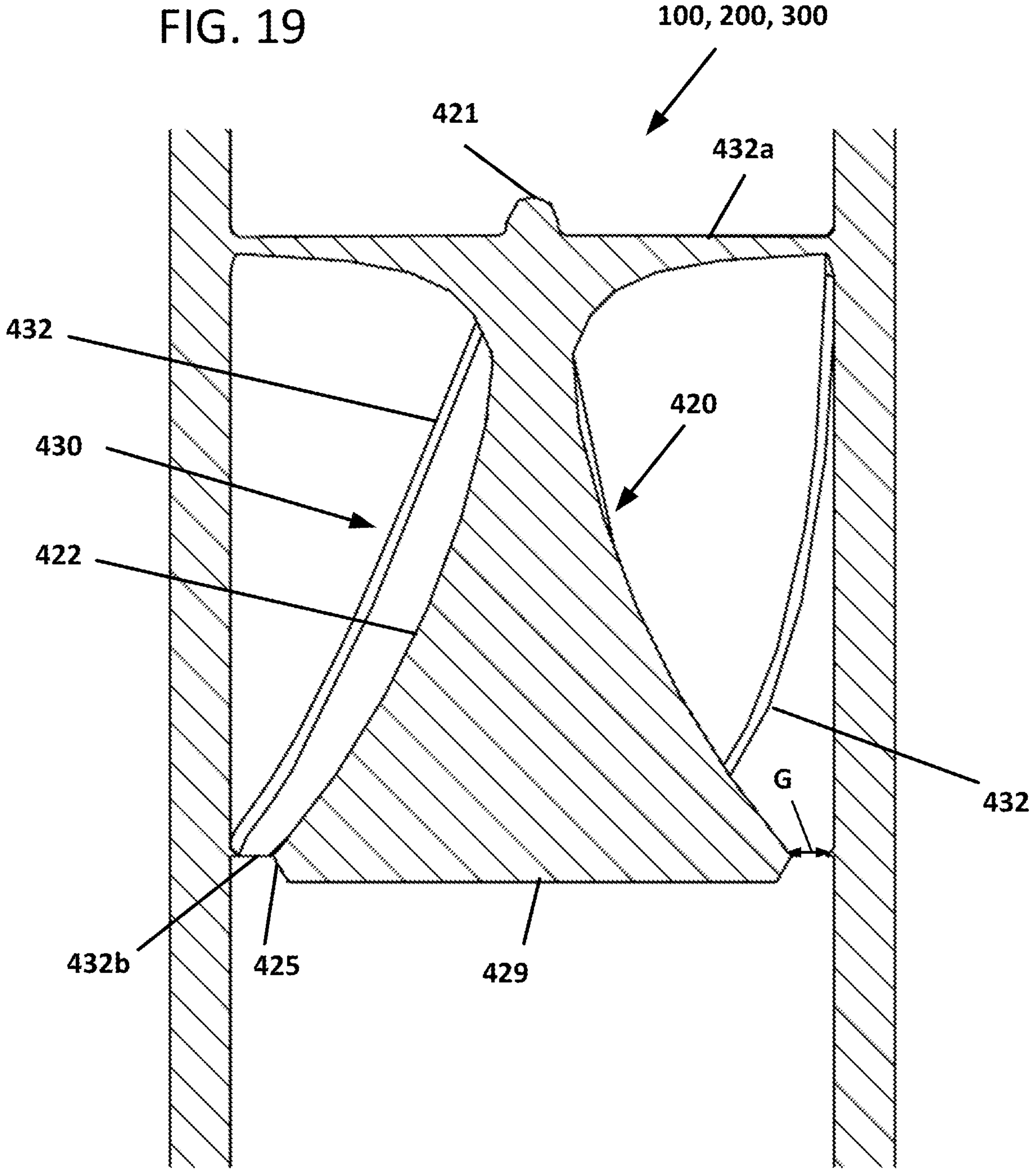
FIG. 19 is an enlarged axial cross-sectional view of the fourth flow diverter and bladed arrangement, the axial cross-sectional view taken along the 19-19 line of FIG. 18.
Figure 20:
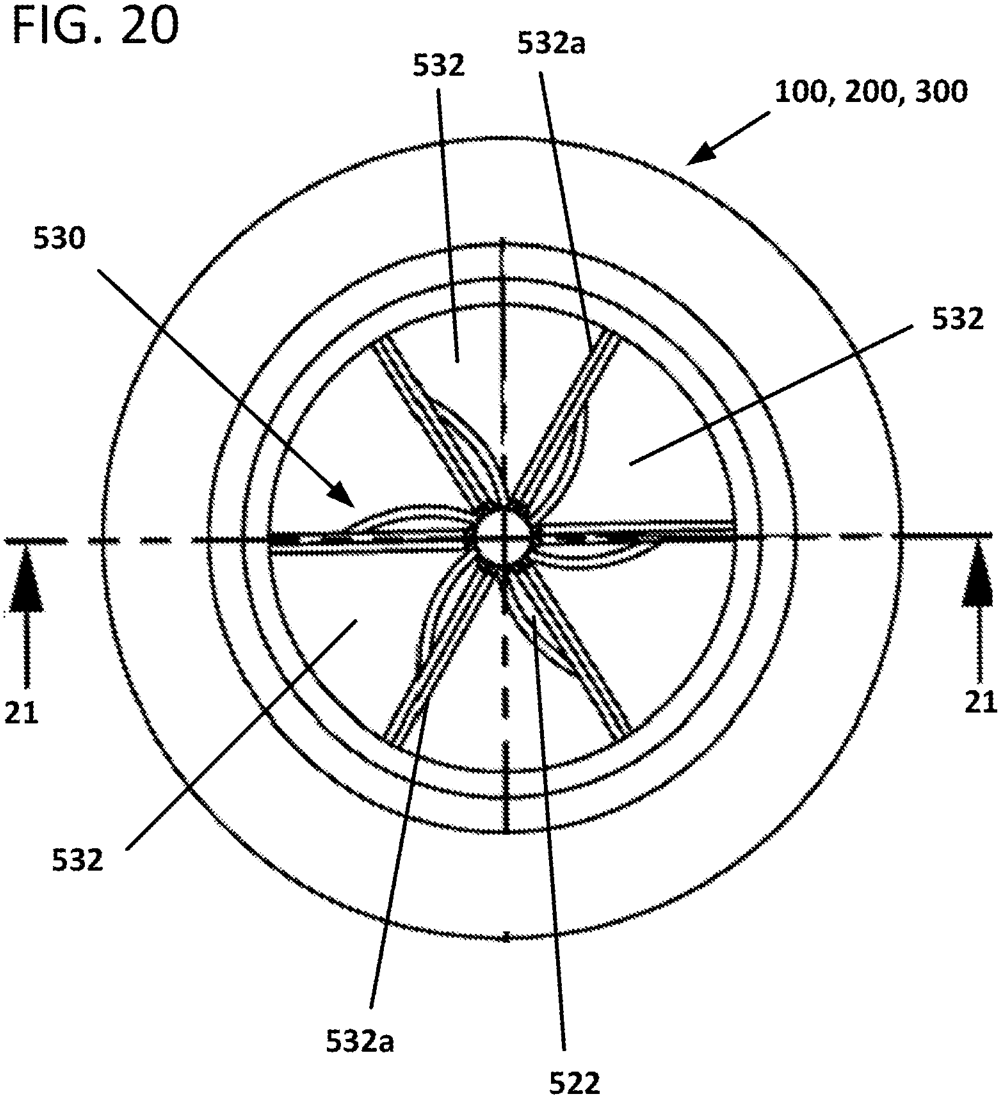
FIG. 20 is an end elevational view of a fifth example flow diverter and bladed arrangement suitable for use with any of the flow separators disclosed herein.
Figure 21:
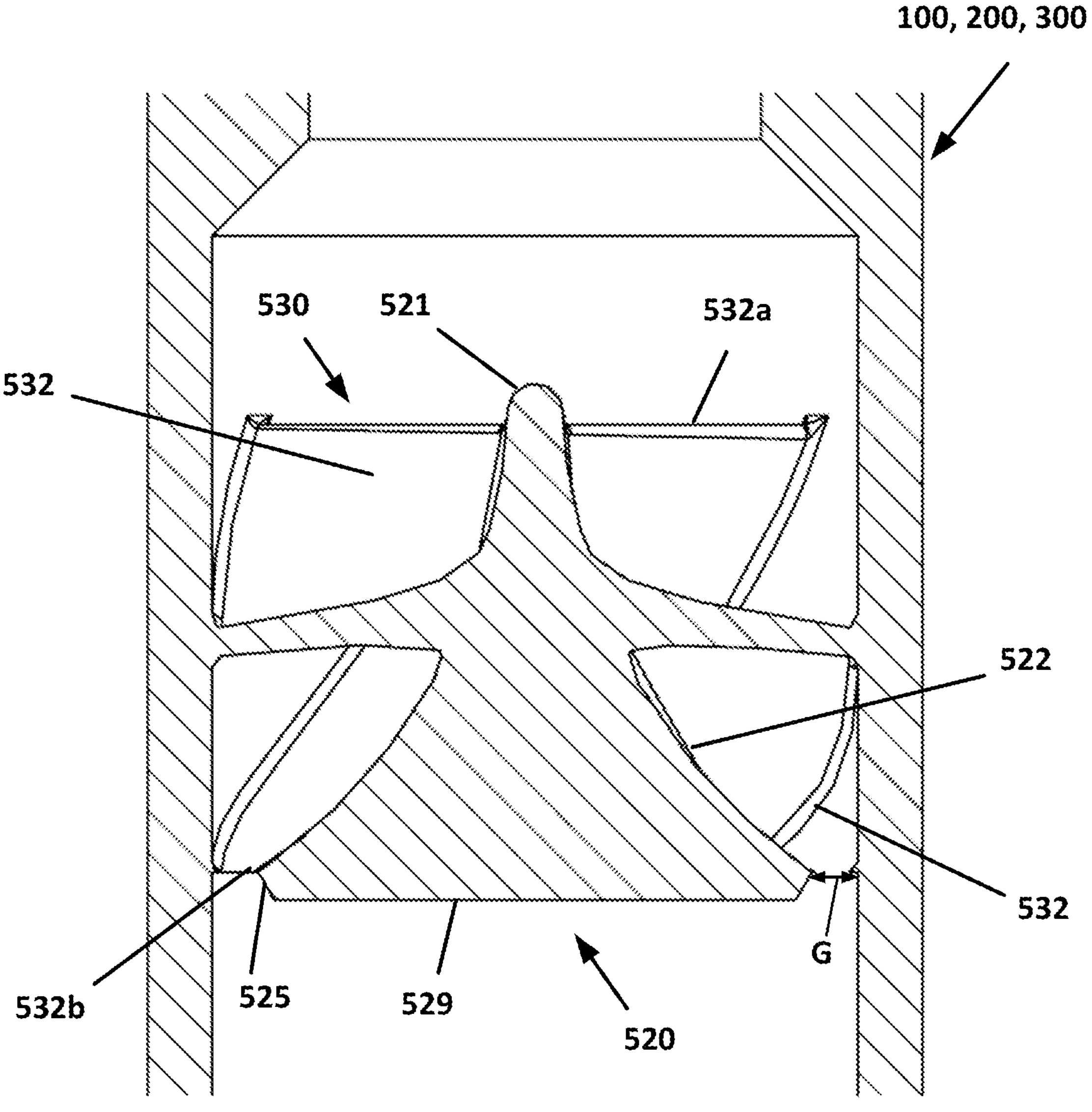
FIG. 21 is an enlarged axial cross-sectional view of the fifth flow diverter and bladed arrangement, the axial cross-sectional view taken along the 21-21 line of FIG. 20.

In some implementations, the blades 132, 232, 332 of the bladed arrangement 130, 230, 330 have a constant pitch as the blades 132, 232, 332 extend along the flow diverter 120, 220, 320 (e.g., see FIG. 5). In other implementations, the blades 432, 532 of the bladed arrangement 430, 530 have a variable pitch as the blades 432, 532 extend along the flow diverter 420, 520. For example, FIGS. 18-21 show example bladed arrangements 430, 530 having variable pitch blades 432, 532. While the bladed arrangements 430, 530 are shown disposed in the flow separator 100 in FIGS. 18 and 20, these bladed arrangements 430, 530 are suitable for use in any of the flow separators 200, 300 disclosed herein. In FIGS. 19 and 21, each blade 432, 532 has a first end 432*a*, 532*a* towards the first end 421, 521 of the flow diverter 420, 520 and a second end 432*b*, 532*b* towards the second end 429, 529 of the flow diverter 420, 520. In certain examples, the blade 432, 532 has a steeper pitch towards the first end 432*a*, 532*a* than towards the second end 432*b*, 532*b*. In certain examples, the pitch of the blade 432, 532 changes gradually as the blade 432, 532 extends along the flow diverter 420, 520.

The swirl region 134, 234, 334 is disposed within the intermediate portion 114, 214 of the flow passage 112, 212, 312 axially between the flow diverter 120, 220, 320, 420, 520 and the outlet 110, 210, 310 of the separator housing 102, 202, 302. The bladed arrangement 130, 230, 330, 430, 530 is adapted to cause flow to swirl about the central axis C within the swirl region 134, 234, 334 such that particles P or other debris within the swirling flow F are centrifugally forced radially outwardly against the main inner surface 116, 216 of the sidewall 118, 218.

A particle collection space 140, 240, 340 is disposed downstream of the flow diverter 120, 220, 320, 420, 520. The particle collection space 140, 240, 340 has an annular shape disposed around the central axis C adjacent the main inner surface 116, 216 of the intermediate portion 114, 214 of the flow passage 112, 212, 312. In certain examples, the particle collection space 140, 240, 340 is demarcated by a barrier wall 142, 242, 342 disposed within the intermediate portion of the flow passage 112, 212, 312. The barrier wall 142, 242, 342 extends around and is radially spaced outwardly from the central axis C. An inner surface 144, 244 of the barrier wall 142, 242, 342 faces towards the central axis C. The outer surface 146, 246 of the barrier wall 142, 242, 342 faces towards the main inner surface 116, 216 of the intermediate portion 114, 214 of the flow passage 112, 212, 312.

An upstream end of the barrier wall 142, 242, 342 is spaced from the flow diverter 120, 220, 320, 420, 520 by a distance. In certain implementations, a correlation exists between the distance and the size or mass of the particles P caught in the particle collection space 140, 240, 340. For example, shortening the distance provides less time for components of the flow F to move radially outwardly towards the inner surface 116, 216 to be caught behind the barrier wall 142, 242, 342. Accordingly, the size or mass of the particles being caught can be restricted based on how far the barrier wall 142, 242, 342 extends towards the flow diverter 120, 220, 320, 420, 520. In certain implementations, a correlation also exists between the transverse cross-dimension of the barrier wall 142, 242, 342 and the size or mass of the particles P caught in the particle collection space 140, 240, 340. Increasing the transverse cross-dimension of the barrier wall 142, 242, 342 reduces the size of the particle collection space so that only particles having sufficient mass to reach the outermost portions of the flow passage 112, 212, 312 will be caught in the particle collection space 140, 240, 340.

In some implementations, the inner surface 144, 244 of the barrier wall 142, 242, 342 defines part of the outlet 110, 210, 310. In other implementations, the inner surface 144, 244 of the barrier wall 142, 242, 342 leads to the outlet 110, 210, 310. In some examples, the inner surface 144, 244 of the barrier wall 142, 242, 342 has a constant transverse cross-dimension along the central axis C. In other examples, the inner surface 144, 244 of the barrier wall 142, 242, 342 tapers radially inwardly as the barrier wall 142, 242, 342 extends along the central axis C towards the outlet 110, 210, 310.

Figure 9:
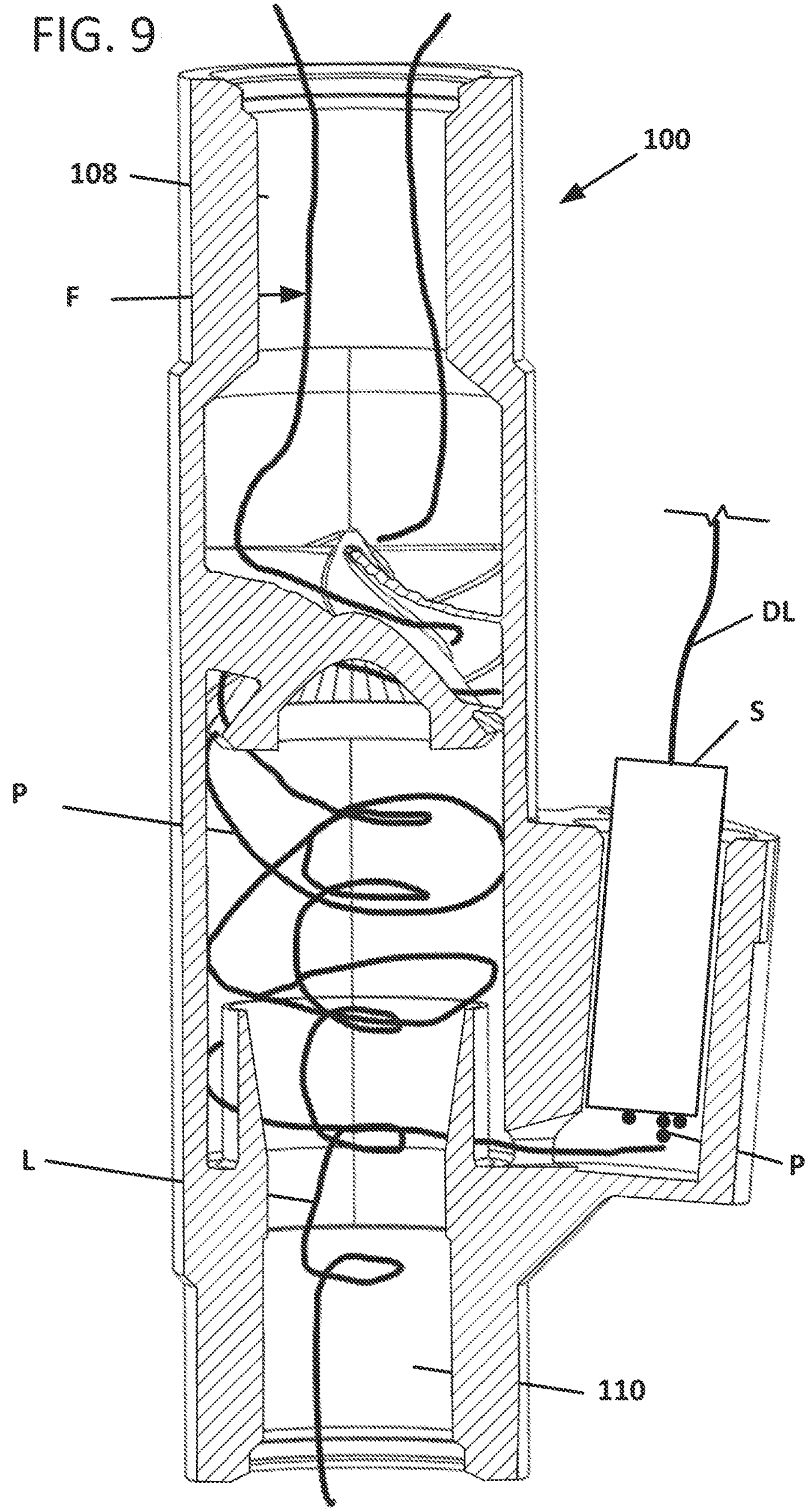
FIG. 9 shows a flow of the liquid and debris particles of the flow input along the flow separator of FIGS. 1-8.
Figure 10:
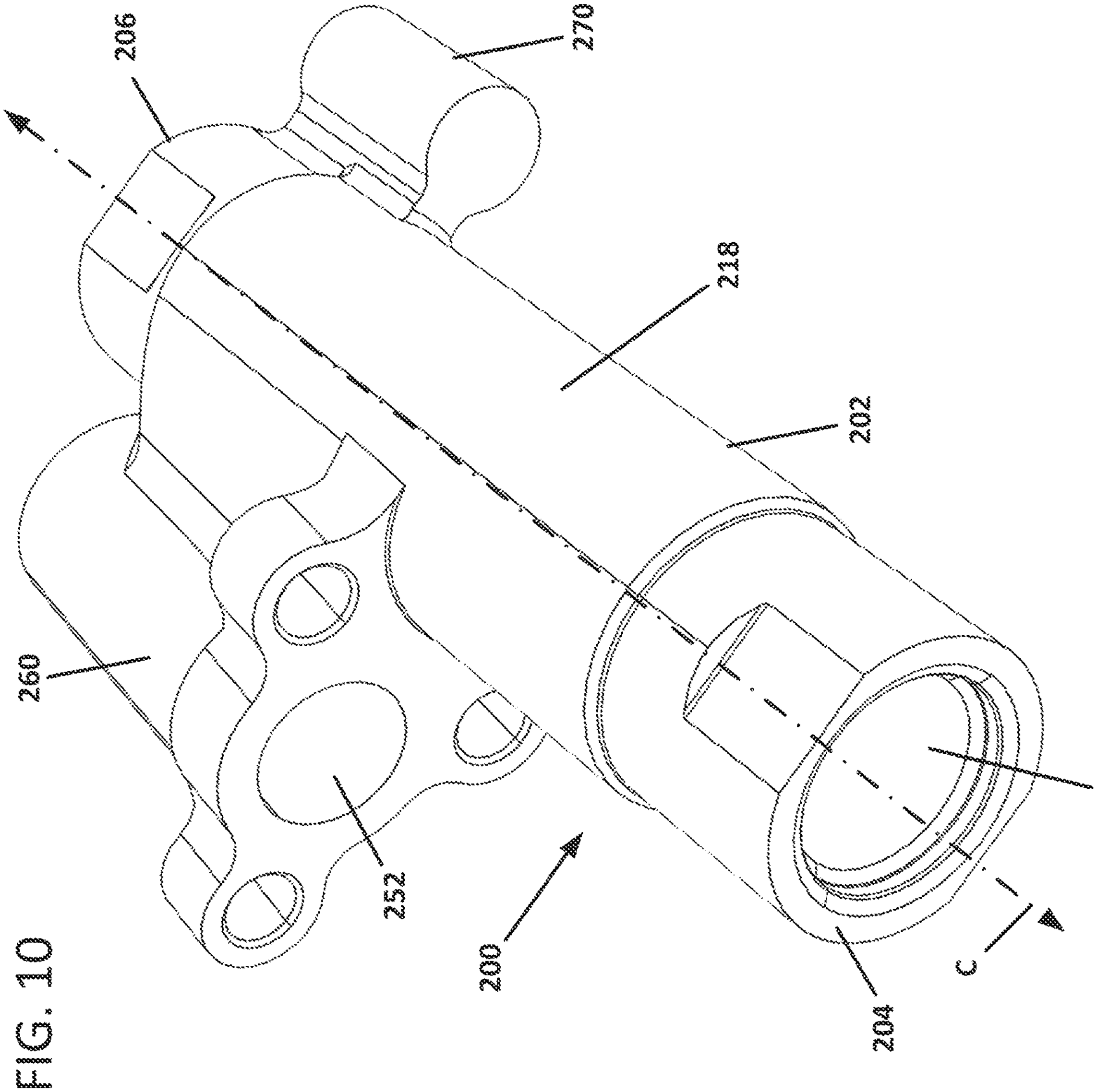
FIG. 10 is a perspective view of a second example flow separator configured in accordance with the principles of the present disclosure.
Figure 11:
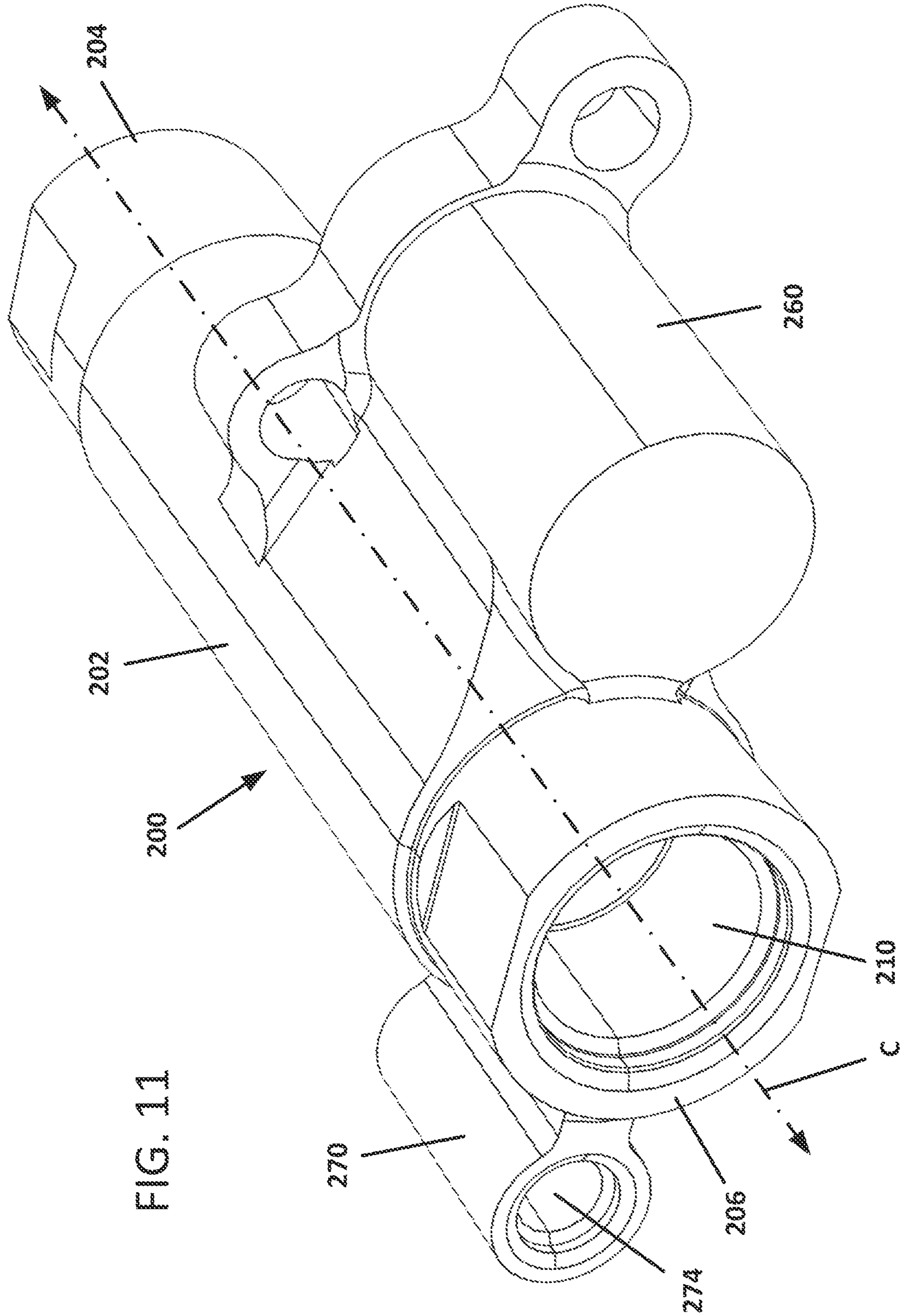
FIG. 11 is another perspective view of the second flow separator of FIG. 10.
Figure 12:
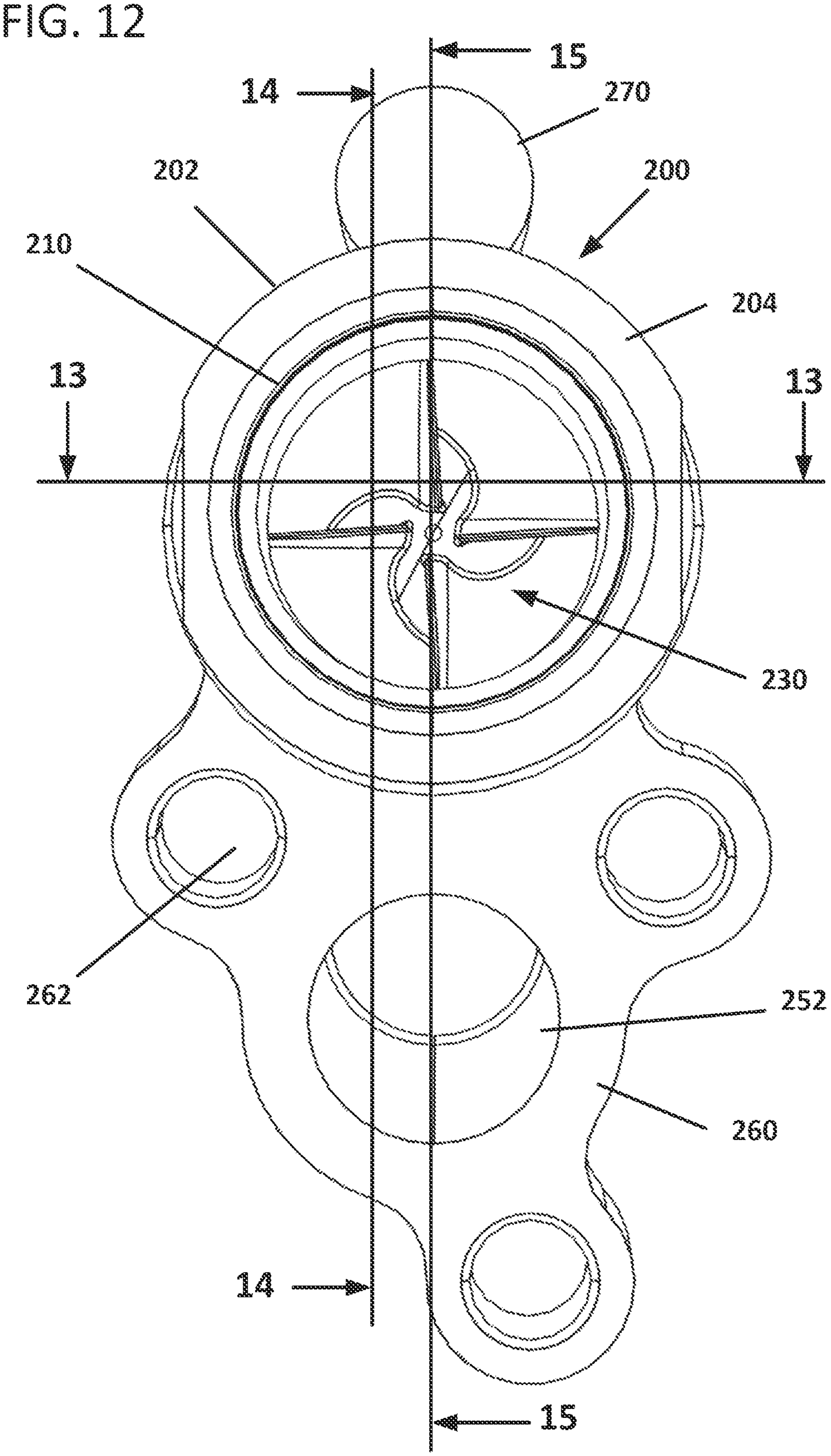
FIG. 12 is an end elevational view of the second flow separator of FIG. 10.

In use, an input flow F including at least a liquid L, such as oil, enters the flow passage 112, 212 at the inlet 108, 208 (e.g., see FIG. 9). The input flow F may carry debris particles P. The input flow F may be aerated (i.e., contain pockets or air or other gas). The input flow F travels through the bladed arrangement 130, 230, 430, 530, which induces swirling of the input flow F around the flow diverter 120, 220, 320, 420, 520, past the second end 129, 229 of the flow diverter 120, 220, 320, 420, 520, and into the swirl region 134, 234. Swirling of the flow F causes radial separation of the components of the input flow F within the swirl region 134, 234 based on centrifugal force. The debris particles P, having a higher mass than the liquid L, are pushed radially against the main inner wall 116, 216 as the debris particles P travel along the flow passage 112, 212. Because the debris particles P are disposed at the main inner wall 116, 216, the debris particles flow between the main inner wall 116, 216 and the barrier wall 142, 242 and into the particle collection space 140. The liquid L is not pressed radially outwardly as far as the debris particles P and passes through the interior of the barrier wall 142, 242 and into the outlet 110, 210.

A path 148, 248, 348 leads from the particle collection space 140, 240, 340 towards a sensor S and/or a collection tank 160, 260, 360. Because the debris particles P are swirling when they enter the particle collection space 140, 240, 340, the debris particles P move from the particle collection space 140, 240, 340, along the path 148, 248, 348, and towards the interior 150, 250, 350 of the collection tank 160, 260, 360 or a sensor conduit 370. In some implementations, the path 148, 248, 348 leads to a collection tank 160, 260, 360 in which the particles P are trapped (e.g., see FIGS. 1-16).

In some examples, a sensor S may be located within the collection tank 160, 260, 360 to sense the trapped particles P. In other examples, the collection tank 160, 260, 360 is configured to facilitate manual inspection. For example, a plug (e.g., a removable magnetic probe and self-closing valve) may be installed at a port 152, 252 of the collection tank 160, 260, 360. In other implementations, the path 148, 248, 348 leads to a sensor conduit 370 along which the particles P may flow past a flow-through type sensor S and then rejoin the main flow F downstream of the sensor S and particle collection space 140, 240, 340 (e.g., see FIG. 17).

The sensor S is configured to detect the presence of particle debris P. In certain implementations, the sensor S is calibrated to detect sensor debris meeting certain characteristics (size, quantity, shape, and/or material composition). In some implementations, the sensor S is a magnetic sensor configured to send a pulse along a data line DL when a debris particle P sufficiently interrupts a magnetic field generated by the sensor S. In certain examples, the sensor S is configured so attract ferrous particle debris P to stick to an end face of the sensor S. An example magnetic sensor suitable for use with the flow separators 100, 200, 300 is the Quantitative Debris Monitoring (QDM) sensor used in the QDM® system available from Eaton. Other suitable examples include pulsed electric chip detector sensors or other chip detector sensors offered by Eaton under the Tedeco® brand. In other implementations, the sensor S is an acoustic sensor capable of sensing ferrous, non-ferruous, and even non-metal debris. An example acoustic sensor suitable for use with the flow separator 100, 200, 300 is shown in U.S. Publication No. 2019/0128788, the disclosure of which is hereby incorporated by reference herein in its entirety. In other implementations, the sensor S is an optical sensor capable of sensing ferrous, non-ferruous, and even non-metal debris. An example optical sensor suitable for use with the flow separator 100, 200, 300 is shown in U.S. Publication No. 2021-0239508, the disclosure of which is hereby incorporated by reference herein in its entirety.

Figure 7:
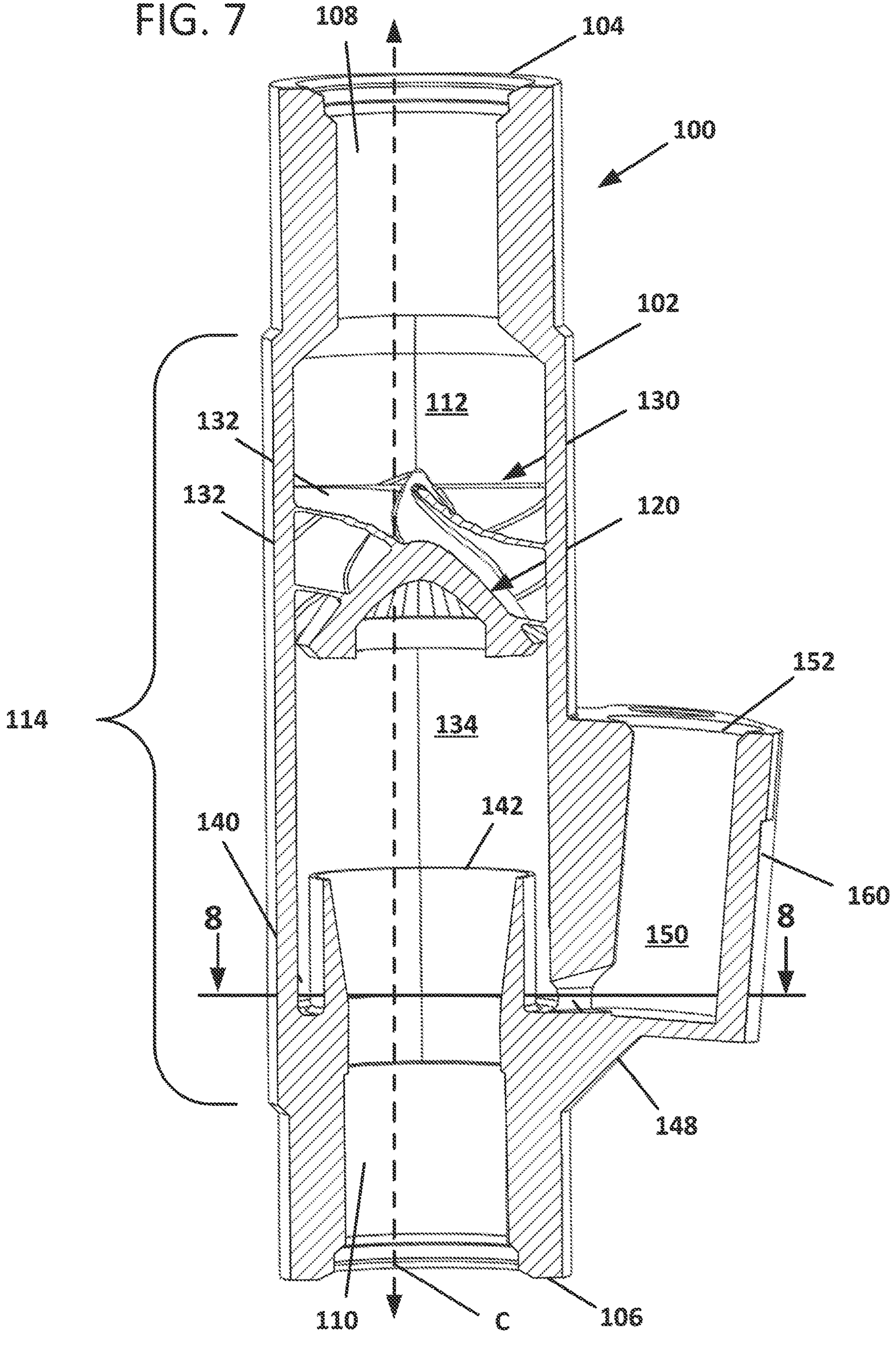
FIG. 7 is an axial cross-sectional view taken along the 7-7 line of FIG. 3.
Figure 8:
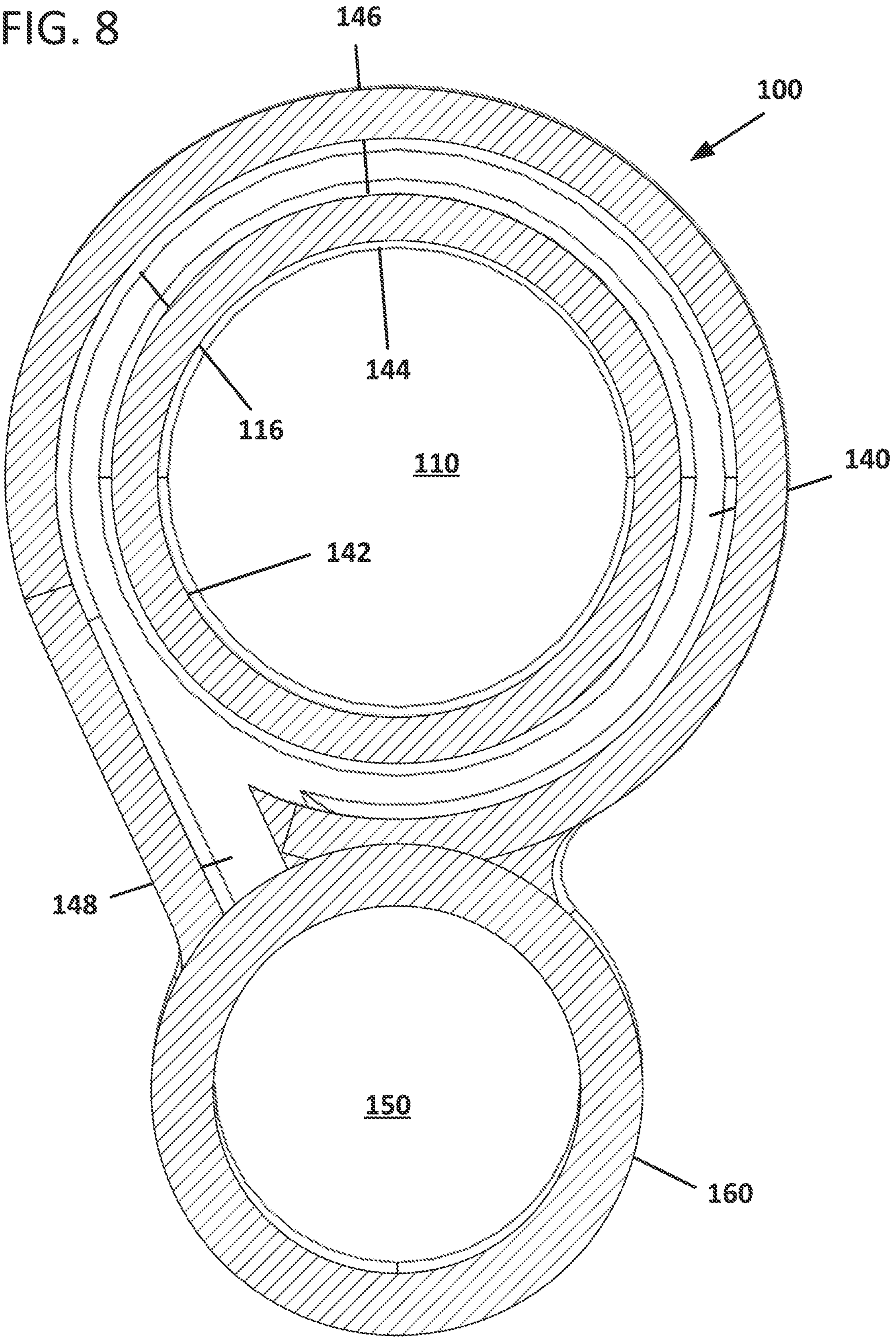
FIG. 8 is a transverse cross-sectional view taken along the 8-8 line of FIG. 7.

Referring to FIGS. 1-16, the separator housing 102, 202, 302 also includes a collection tank 160, 260, 360 fluidly coupled to the particle collection space 140, 240, 340 by the path 148, 248, 348 (e.g., see FIGS. 7 and 8). In some implementations, the path 148, 248, 348 extends tangentially from the particle collection space 140, 240, 340 (e.g., see FIG. 8). In other implementations, the path 148, 248, 348 can extend at an angle towards the outlet 110, 210, 310, radially outward, or along any desired path shape. Debris particles P entering the collection space 140, 240, 340 flow along the collection space 140, 240, 340 to the path 148, 248, 348 and then to an interior 150, 250, 350 of the collection tank 160, 260, 360. As shown in FIG. 7, the collection tank 160, 260, 360 defines a sensor port 152, 252 leading to the interior 150, 250, 350 of the collection tank 160, 260, 360. The sensor S can be mounted at the sensor port 152, 252 so that the sensor S extends into the interior 150, 250, 350 of the collection tank 160, 260, 360. Additional openings 162, 262 are provided to facilitate mounting of a sensor S at the sensor port 152, 252 (e.g., may receive fasteners aligned with fastener apertures defined by a housing of the sensor S).

Figure 16:
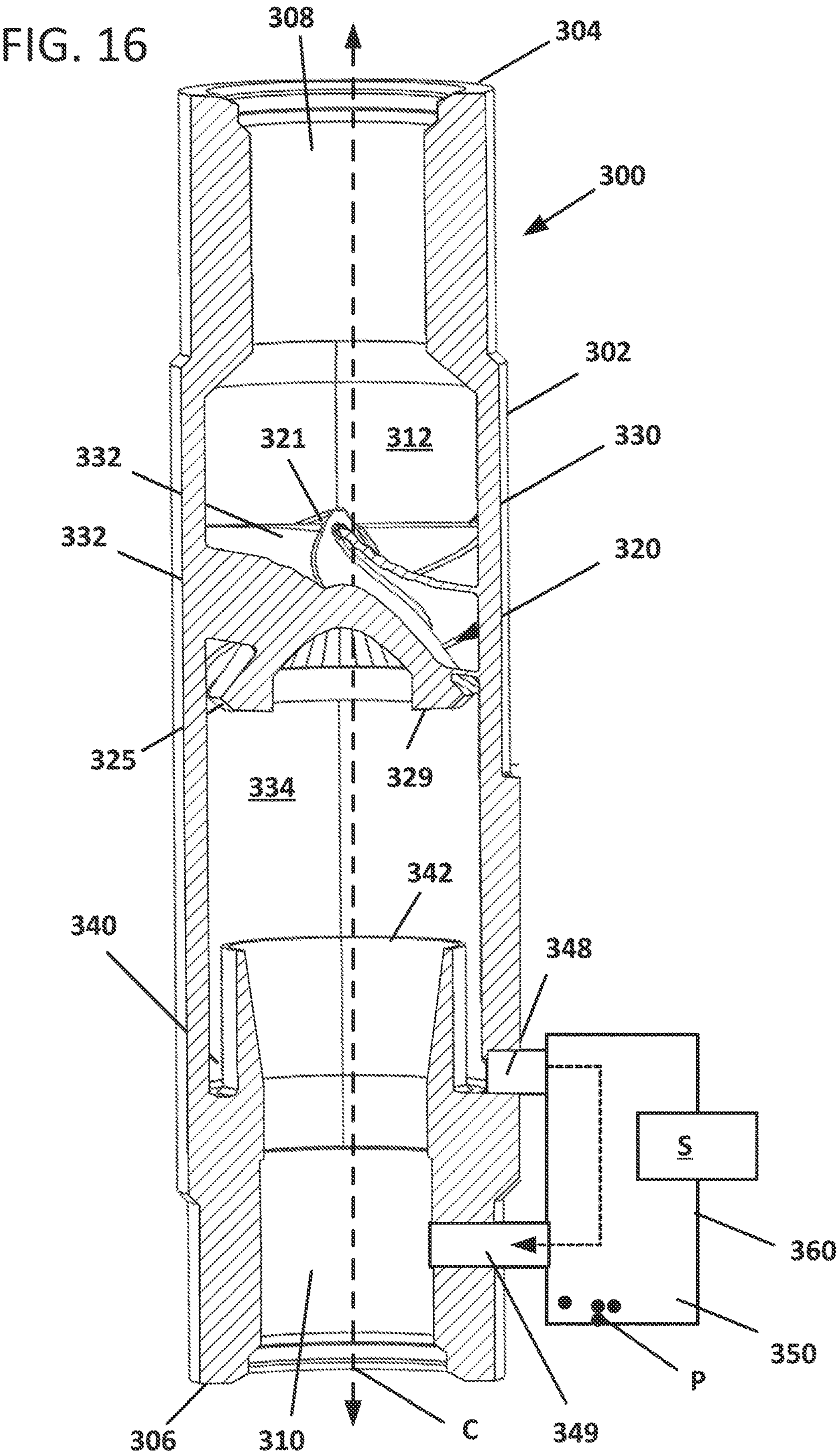
FIG. 16 is an axial cross-sectional view of another example flow separator showing a slipstream type sensor flow for a third example flow separator and bladed arrangement.

Referring to FIG. 16, the particles P may be carried into the collection tank 360 along a slipstream extending between the path 348 and a return path 349 leading back to the main flow F. For example, the collection tank 360 may be filled with oil or other liquid. In the example shown, the return path 349 leads to the outlet 310. In other examples, the return path 349 may lead to a conduit or equipment disposed downstream of the flow separator 300. Oil or other liquid may travel along the slip stream between the path 348 and the return path 349. In some implementations, at least some particles may be separated from the slipstream and retained within the collection tank 360. For example, particles P of a particular mass may drop from the slipstream to the collection pocket by gravity. In another example, ferrous particles may be attracted by a magnet in the collection pocket.

Figure 17:
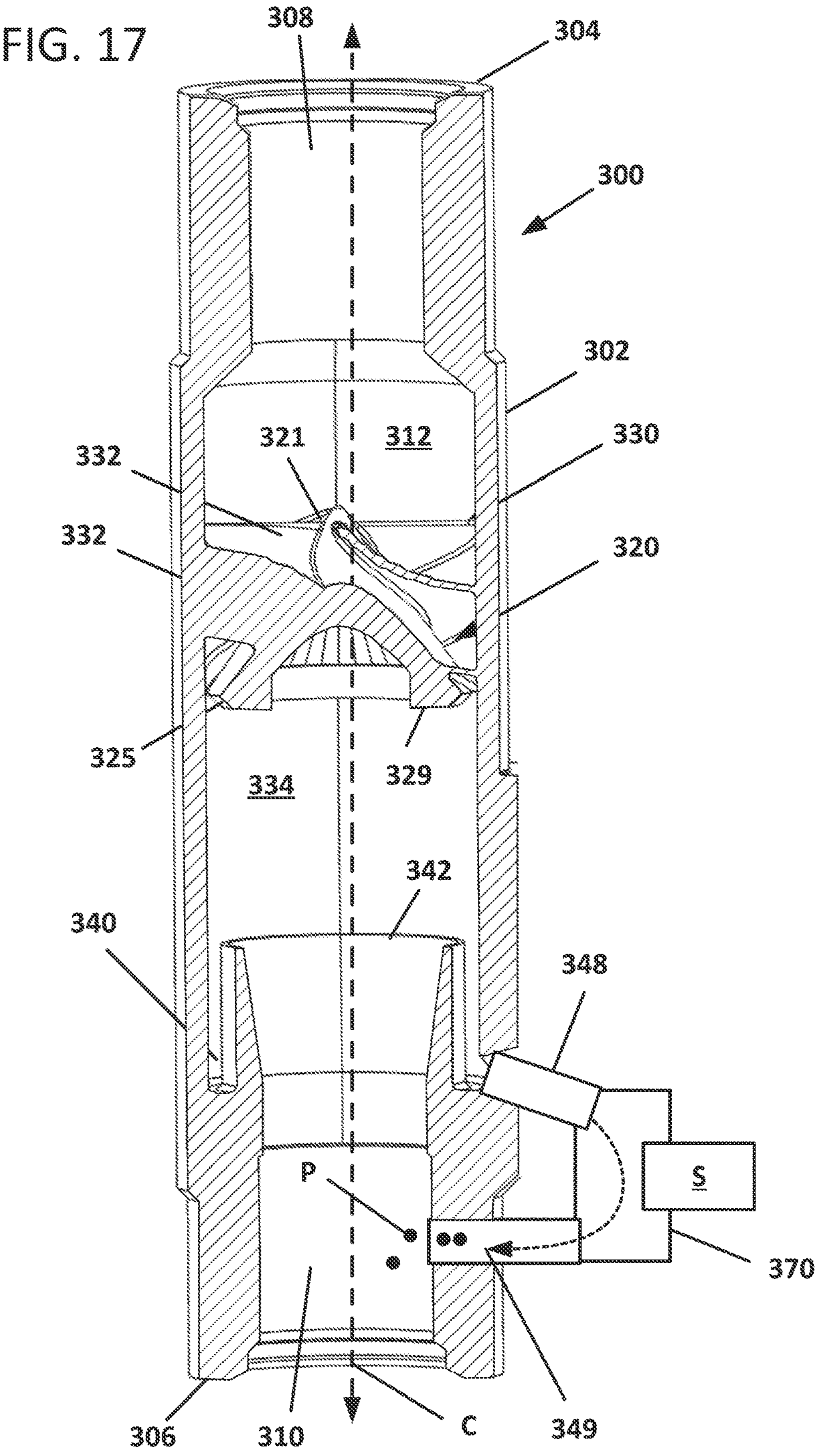
FIG. 17 is an axial cross-sectional view of the example flow separator of FIG. 16 except a sensor conduit replaces the collection tank.
Figure 18:
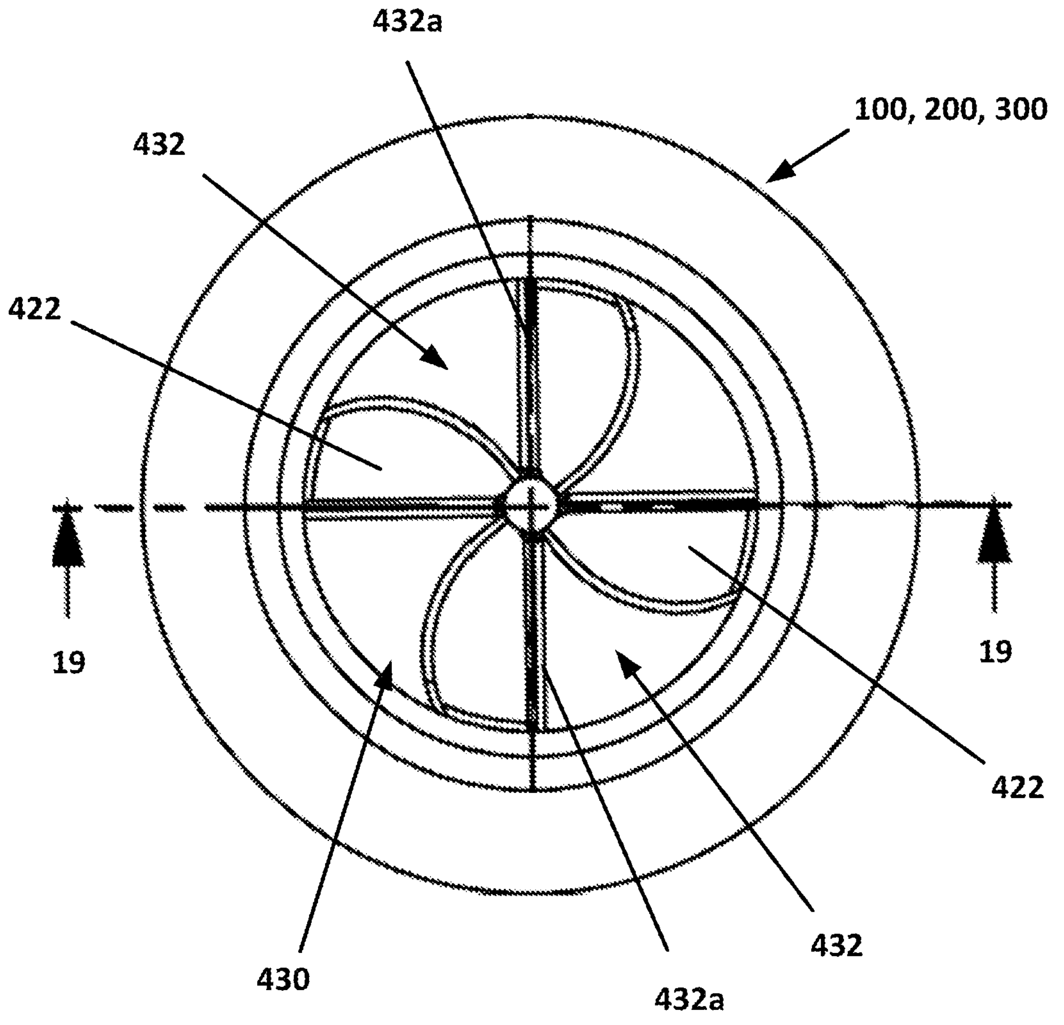
FIG. 18 is an end elevational view of a fourth example flow diverter and bladed arrangement suitable for use with any of the flow separators disclosed herein.

Referring to FIG. 17, the sensor conduit 370 does not include a collection pocket in which debris particles P can be retained. Rather, the debris particles P are carried through the sensor conduit 370, past the sensor S, and into the return path 349 to rejoin the flow F. In the example shown, the return path 349 leads to the outlet 310. In other examples, the return path 349 may lead to a conduit or equipment disposed downstream of the flow separator 300. It will be understood that the sensor conduit can be utilized instead of the collection tank 160, 260, 360 in any of the flow separators 100, 200, 300 disclosed herein.

FIGS. 10-15 illustrate an example flow separator 200 that also separates out air or other gases from the liquid L in addition to separating out debris particles P. The separator housing 202 includes a gas outlet mount 270 extending outwardly from the sidewall 218. The gas outlet mount 270 defines a gas outlet port 274 at which a hose or other conduit may be coupled to the separator housing 102 to receive the separated out air or other gas.

Figure 13:
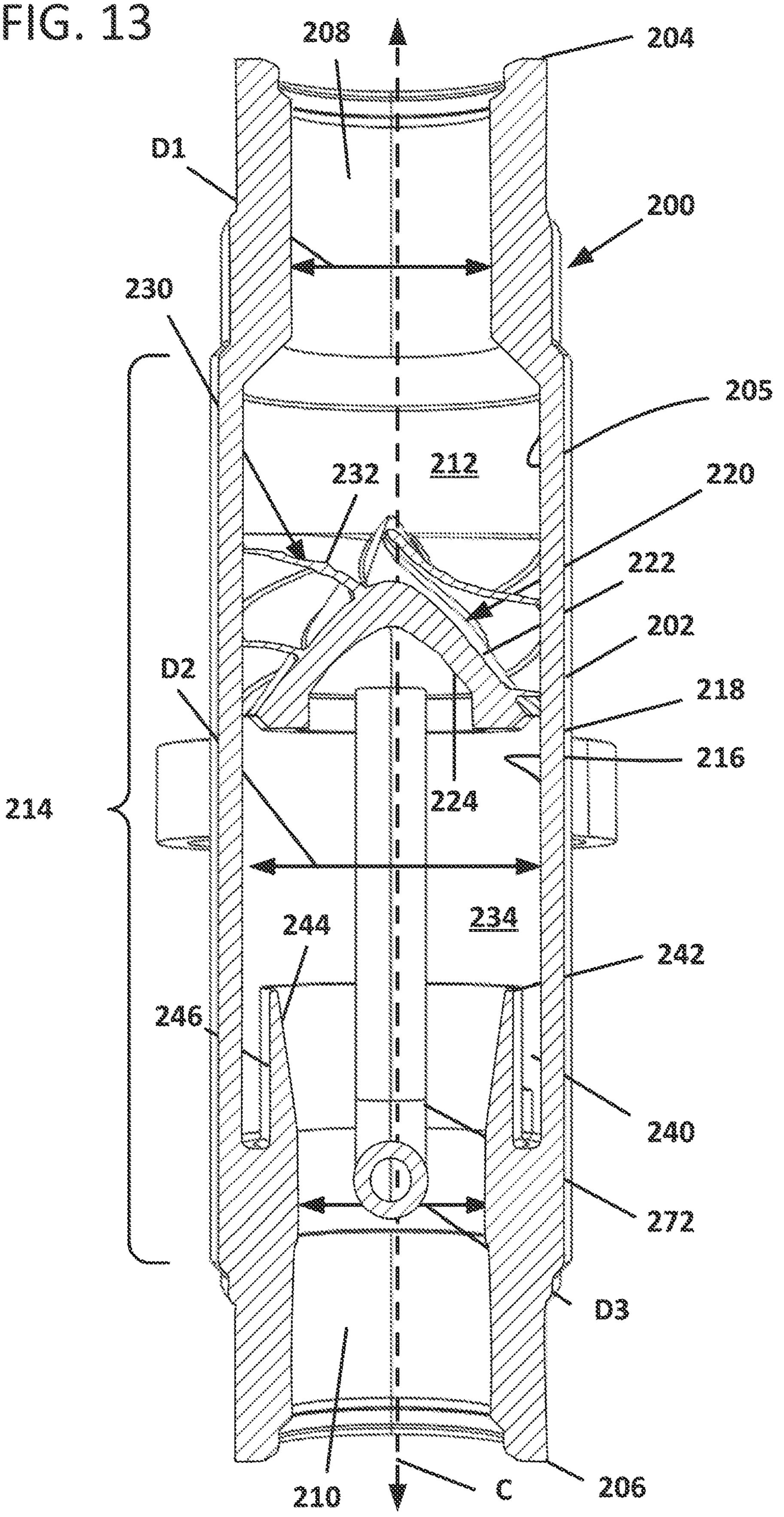
FIG. 13 is an axial cross-sectional view taken along the 13-13 line of FIG. 12 showing a second example flow diverter and bladed arrangement.
Figure 14:
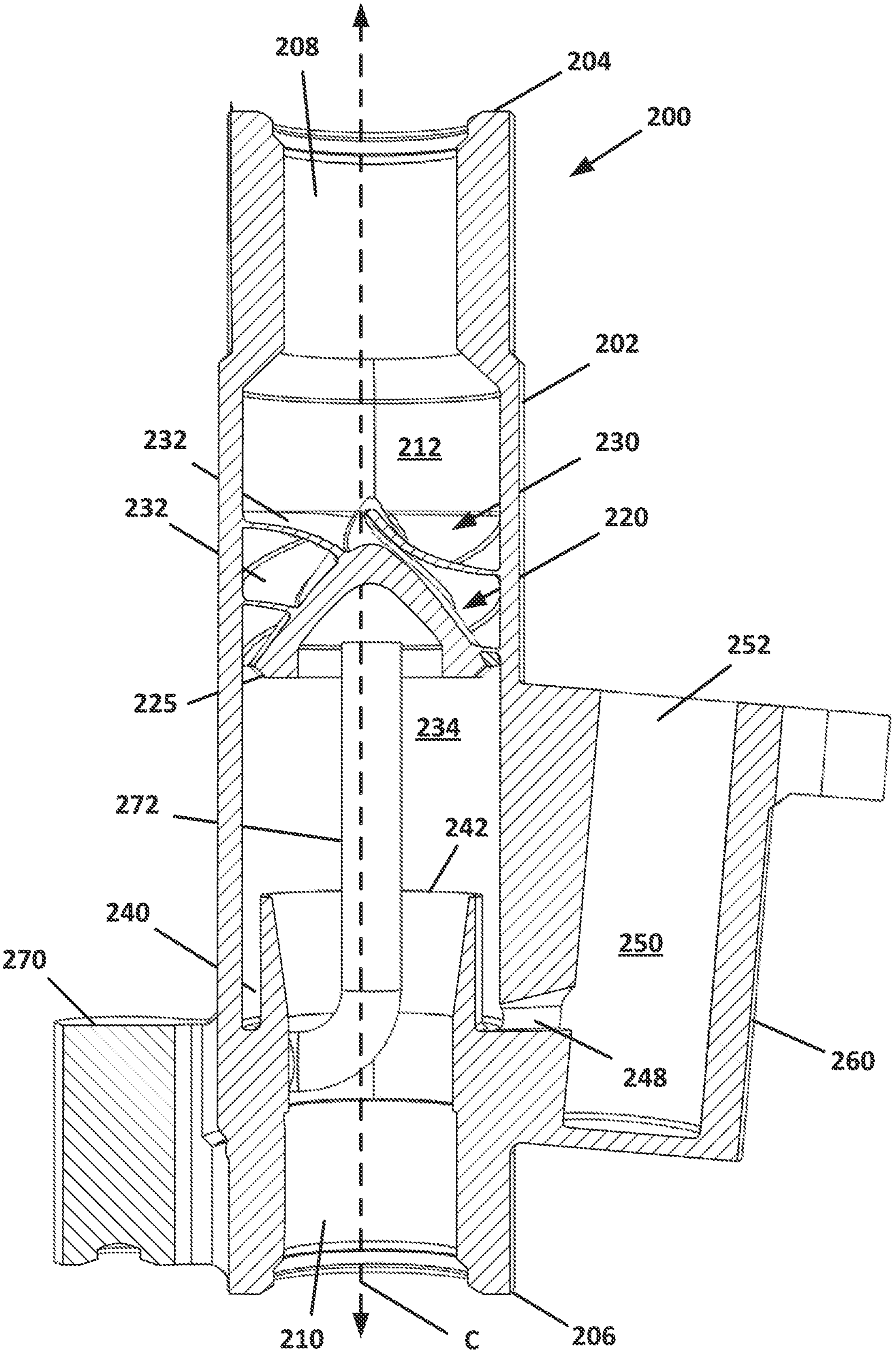
FIG. 14 is an axial cross-sectional view taken along the 14-14 line of FIG. 12.
Figure 15:
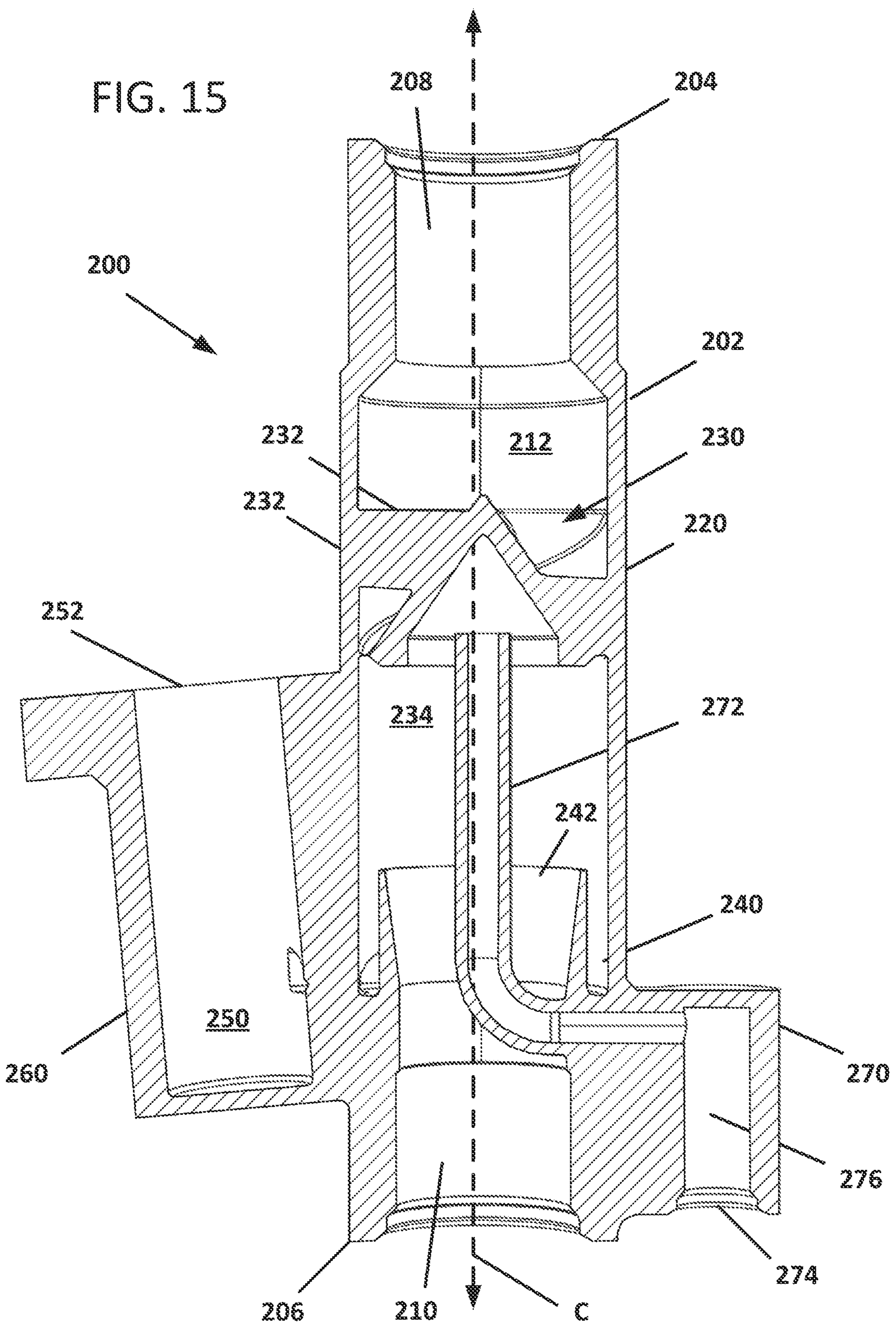
FIG. 15 is an axial cross-sectional view taken along the 15-15 line of FIG. 12.

As shown in FIGS. 13 and 15, a conduit 272 extends from an interior 276 of the gas outlet mount 270, into the intermediate portion 114 of the flow passage 212, and upstream towards the flow diverter 220. In certain examples, the conduit 272 extends into a hollow cavity of the flow diverter 220. In other examples, the entrance to the conduit 272 is disposed downstream of the second end 229 of the flow diverter 220. In certain implementations, an upstream portion of the conduit 272 extends coaxial with the central axis C. Because the gas has less mass than the liquid L, the gas swirls more tightly to the central axis C than the liquid L or the debris particles P. Accordingly, the gas enters the conduit 272 while the liquid L bypasses the conduit 272 and flows through the swirl region 234. In certain implementations, the conduit 272 extends through the barrier wall 242. In certain examples, a downstream portion of the conduit 272 extends through a sidewall defining the outlet 210 to reach the interior 276 of the gas outlet mount 270 (e.g., see FIG. 15).

Aspects of the Disclosure

Aspect 1. A flow separator comprising:

a separator housing defining a central axis, the separator housing including a length that extends along the central axis between first and second ends of the separator housing, the first end of the separator housing defining an inlet of the separator housing and the second end of the separator housing defining an outlet of the separator housing, the inlet and the outlet being co-axially aligned along the central axis, the separator housing defining a flow passage that extends through the separator housing along the central axis from the inlet to the outlet, an enlarged diameter portion of the flow passage being defined by a main inner surface of a sidewall of the separator housing that surrounds the central axis;

a flow diverter positioned within the flow passage, the flow diverter being co-axially aligned with the central axis and including an outer surface that faces at least partially toward the inlet, the outer surface defining an outer cone diameter of the flow diverter that enlarges as the outer surface extends toward the outlet of the separator housing;

helical flow-turning blades positioned between the outer surface of the flow diverter and the main inner surface of the sidewall of the separator housing for causing flow moving through the flow passage toward the outlet to swirl about the central axis;

a particle collection space defined by the separator housing around the central axis adjacent the main inner surface of the enlarged diameter portion of the flow passage of the separator housing, the particle collection space having an annular shape and being located downstream of the flow diverter; and a swirl region within the enlarged diameter portion of the flow passage axially between the flow diverter and the outlet of the separator housing, wherein the particle collection space is located at a downstream end of the swirl region, wherein the helical flow-turning blades are adapted to cause flow to swirl about the central axis within the swirl region such that particles within the swirling flow are centrifugally forced radially outwardly against the main inner surface of the sidewall and are captured in the particle collection space.

Aspect 2. The flow separator of claim 1, wherein the particle collection space is defined between the main inner surface of the flow passage and an annular particle collection wall spaced radially inwardly from the main inner surface, wherein an outer surface of the particle collection wall faces radially toward the particle collection space and an inner surface of the particle collection wall defines a portion of the outlet of the separator housing.

Aspect 3. The flow separator of aspect 1, wherein the separator housing includes an expansion region upstream of the flow diverter where an inner diameter for the flow passage expands from an inlet diameter to the enlarged diameter portion of the flow passage.

Aspect 4. The flow separator of aspect 2, wherein the inner surface of the particle collection wall defines an outlet diameter that reduces as the particle collection wall extends in a downstream direction.

Aspect 5. The flow separator of aspect 1, further comprising:

a gas outlet mount coupled to the separator housing, the gas outlet mount defining a gas outlet port leading to an interior of the gas outlet mount; and a conduit extending from an the interior of the gas outlet mount, into the flow passage, and upstream towards the flow diverter.

Aspect 6. The flow separator of aspect 1, wherein an outer diameter of a downstream portion of the flow diverter is spaced radially inwardly from the main inner surface by a distance that is less than 25% of a transverse cross-dimension of the inlet.

Aspect 7. The flow separator of aspect 6, wherein the distance is less than 15% of the transverse cross-dimension of the inlet.

Aspect 8. The flow separator of aspect 6, wherein the distance is no more than 10% of the transverse cross-dimension of the inlet.

Aspect 9. The flow separator of aspect 1, further comprising a sensor housing coupled to the separator housing, the sensor housing having an interior in fluid communication with the particle collection space via a path.

Aspect 10. The flow separator of aspect 9, wherein the path extends tangentially to the annular shape of the particle collection space.

Aspect 11. The flow separator of any of aspects 1-10, wherein the flow diverter is trumpet shaped, and the outer surface includes a trumpet shaped outer surface.

Aspect 12. The flow separator of any of aspects 1-10, wherein the flow diverter is conically shaped, and the outer surface includes a conical outer surface.

Aspect 13. The flow separator of any of aspects 1-12, wherein the flow diverter includes a hollow interior defined by an inner surface that faces at least partially toward the outlet, the inner surface defining an inner diameter of the flow diverter that enlarges as the inner surface extends toward the outlet of the separator housing.

Aspect 14. A flow separator comprising:

a separator housing extending along a central axis between an inlet and an outlet, the separator housing defining a flow passage that extends through the separator housing along the central axis from the inlet to the outlet, the flow passage having an intermediate portion having a larger transverse cross-dimension than the inlet;

a flow diverter disposed within the flow passage, the flow diverter having a first surface facing at least partially toward the inlet and a second surface facing at least partially towards the outlet, a bladed arrangement disposed around the flow diverter so that at least a portion of the bladed arrangement is disposed radially between the flow diverter and the separator housing, the bladed arrangement being configured to direct flow in a swirl around the flow diverter;

a swirl region disposed along the flow passage and extending downstream of the flow diverter; and a barrier wall disposed within the flow passage at an opposite end of the swirl region from the flow diverter, the barrier wall cooperating with the flow passage to define an annularly shaped particle collection space having a pathway leading outwardly away from the particle collection space.

Aspect 15. The flow separator of aspect 14, wherein the flow diverter has a conical shape.

Aspect 16. The flow separator of aspect 14 or aspect 15, wherein the bladed arrangement includes a plurality of blades forming a helical flow path.

Aspect 17. The flow separator of any of aspects 14-16, wherein the pathway leads to a sensor housing includes a sensor port configured to receive a particle sensor.

Aspect 18. The flow separator of any of aspects 14-16, wherein the pathway leads to a collection tank configured to retain particle debris received via the pathway.

Aspect 19. The flow separator of aspect 18, wherein the collection tank is configured to receive a particle sensor.

Aspect 20. The flow separator of aspect 18, further comprising a plug extending into an interior of the collection tank, the plug being removable to access particles stored in the collection tank.

Aspect 21. The flow separator of aspect 18, further comprising a return path leading downstream of the particle collection space, the return path cooperating with the pathway to produce a slipstream passing by a collection pocket.

Aspect 22. The flow separator of any of aspects 14-16, wherein the pathway leads to a sensor conduit in which a sensor is disposed, the sensor conduit leading downstream of the particle collection space without passing by a collection pocket.

Aspect 23. The flow separator of any of aspects 14-22, wherein the flow diverter extends along the central axis from a first end to a second end, the second end having a larger transverse cross-dimension than the first end, wherein at least portions of the second end of the flow diverter being radially spaced from the flow passage by a distance to define flow passages past the flow diverter, the distance being less than 25% of a transverse cross-dimension of the inlet.

Aspect 24. The flow separator of aspect 23, wherein the distance is less than 15% of the transverse cross-dimension of the inlet.

Aspect 25. The flow separator of aspect 23, wherein the distance is less than 10% of the transverse cross-dimension of the inlet.

Aspect 26. The flow separator of any of aspects 14-25, wherein the flow diverter is mounted within the flow passage by the bladed arrangement.

Aspect 27. The flow separator of any of aspects 14-26, further comprising:

a gas outlet mount coupled to the separator housing, the gas outlet mount defining a gas outlet port; and a conduit having an upstream portion extending coaxial with the central axis and a downstream portion extending to the gas outlet mount.

Aspect 28. The flow separator of aspect 27, wherein the conduit extends into a hollow interior of the flow diverter.

Aspect 29. The flow separator of any of aspects 14-28, wherein the second surface of the flow diverter is an inner surface defining a hollow interior of the flow diverter.

Aspect 30. The flow separator of any of aspects 14-28, wherein the second surface of the flow diverter is a flat surface facing the outlet.

Aspect 31. The flow separator of any of aspects 14-28, wherein the second surface of the flow diverter is a protruding surface facing at least partially towards the outlet.

Aspect 32. The flow separator of any of aspects 14-28, wherein the second surface of the flow diverter tapers radially inwardly as the second surface extends downstream towards the outlet.

Aspect 33. The flow separator of aspect 31 or aspect 32, wherein the second surface has a conical shape.

Aspect 34. The flow separator of any of aspects 31-33, wherein the second surface leads to an inner surface defining a hollow interior of the flow diverter.

Aspect 35. A flow separator comprising:

a separator housing defining a central axis, the separator housing including a length that extends along the central axis between first and second ends of the separator housing, the first end of the separator housing defining an inlet of the separator housing and the second end of the separator housing defining an outlet of the separator housing, the inlet and the outlet being co-axially aligned along the central axis, the separator housing defining a flow passage that extends through the separator housing along the central axis from the inlet to the outlet, an enlarged diameter portion of the flow passage being defined by a main inner surface of a sidewall of the separator housing that surrounds the central axis;

a conical flow diverter positioned within the flow passage, the conical flow diverter being co-axially aligned with the central axis and including a conical outer surface that faces at least partially toward the inlet, the conical outer surface defining an outer cone diameter of the conical flow diverter that enlarges as the conical outer surface extends toward the outlet of the separator housing, the conical flow diverter having a hollow interior defined by a conical inner surface that faces at least partially toward the outlet, the conical inner surface defining an inner cone diameter of the conical flow diverter that enlarges as the conical inner surface extends toward the outlet of the separator housing;

helical flow-turning blades positioned between the conical outer surface of the conical flow diverter and the main inner surface of the sidewall of the separator housing for causing flow moving through the flow passage toward the outlet to swirl about the central axis;

a particle collection space defined by the separator housing around the central axis adjacent the main inner surface of the enlarged diameter portion of the flow passage of the separator housing, the particle collection space having an annular shape and being located downstream of the conical flow diverter; and a swirl region within the enlarged diameter portion of the flow passage axially between the conical flow diverter and the outlet of the separator housing, wherein the particle collection space is located at a downstream end of the swirl region, wherein the helical flow-turning blades are adapted to cause flow to swirl about the central axis within the swirl region such that particles within the swirling flow are centrifugally forced radially outwardly against the main inner surface of the sidewall and are captured in the particle collection space.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A flow separator comprising:

a separator housing defining a central axis, the separator housing including a length that extends along the central axis between first and second ends of the separator housing, the first end of the separator housing defining an inlet of the separator housing and the second end of the separator housing defining an outlet of the separator housing, the inlet and the outlet being co-axially aligned along the central axis, the separator housing defining a flow passage that extends through the separator housing along the central axis from the inlet to the outlet, an enlarged diameter portion of the flow passage being defined by a main inner surface of a sidewall of the separator housing that surrounds the central axis, the enlarged diameter portion of the flow passage having a larger diameter than the inlet;

a flow diverter positioned within the flow passage, the flow diverter being co-axially aligned with the central axis and including an outer surface that faces at least partially toward the inlet, the outer surface defining an outer diameter of the flow diverter that enlarges as the outer surface extends toward the outlet of the separator housing;

helical flow-turning blades positioned between the outer surface of the flow diverter and the main inner surface of the sidewall of the separator housing for causing flow moving through the flow passage toward the outlet to swirl about the central axis;

a particle collection space defined by the separator housing around the central axis adjacent the main inner surface of the enlarged diameter portion of the flow passage of the separator housing, the particle collection space having an annular shape and being located downstream of the flow diverter, wherein the particle collection space is defined between the main inner surface of the flow passage and an annular particle collection wall spaced radially inwardly from the main inner surface; and a swirl region within the enlarged diameter portion of the flow passage axially between the flow diverter and the outlet of the separator housing, wherein the particle collection space is located at a downstream end of the swirl region, wherein the helical flow-turning blades are adapted to cause flow to swirl about the central axis within the swirl region such that particles within the swirling flow are centrifugally forced radially outwardly against the main inner surface of the sidewall and are captured in the particle collection space;

wherein the flow diverter is positioned within the enlarged diameter portion of the flow passage at a location axially spaced form the inlet, wherein the main inner surface is cylindrical, wherein an outer diameter of a downstream portion of the flow diverter is spaced radially inwardly from the main inner surface by a distance that is less than 25% of a transverse cross-dimension of the inlet, wherein the flow diverter includes a hollow interior defined by an inner surface that faces at least partially toward the outlet, and wherein the flow diverter has an open downstream end providing fluid communication between the swirl region and the hollow interior; a gas outlet mount coupled to an exterior of the separator housing, the gas outlet mount defining a gas outlet port leading to an interior of the gas outlet mount; and a conduit extending from the gas outlet mount into an interior of the separator housing, through the flow passage, and upstream towards the flow diverter, wherein the conduit extends from the gas outlet port into the open downstream end and into the hollow interior of the flow diverter.

2. The flow separator of claim 1, wherein the flow diverter is trumpet shaped, and the outer surface includes a trumpet shaped outer surface.

3. The flow separator of claim 1, wherein the flow diverter is conically shaped, and the outer surface includes a conical outer surface.

4. The flow separator of claim 1, wherein the inner surface defining an inner diameter of the flow diverter that enlarges as the inner surface extends toward the outlet of the separator housing.

5. The flow separator of claim 4, wherein the inner surface is a conical inner surface.

6. The flow separator of claim 1, wherein an outer surface of the particle collection wall faces radially toward the particle collection space and an inner surface of the particle collection wall defines a portion of the outlet of the separator housing.

7. The flow separator of claim 6, wherein the inner surface of the particle collection wall defines an outlet diameter that reduces as the particle collection wall extends in a downstream direction.

8. The flow separator of claim 1, wherein the separator housing includes an expansion region upstream of the flow diverter where an inner diameter for the flow passage expands from an inlet diameter to the enlarged diameter portion of the flow passage.

9. The flow separator of claim 1, wherein the distance is less than 15% of the transverse cross-dimension of the inlet.

10. The flow separator of claim 1, further comprising a sensor housing coupled to the separator housing, the sensor housing having an interior in fluid communication with the particle collection space via a path.

11. The flow separator of claim 10, wherein the path extends tangentially to the annular shape of the particle collection space.

12. The flow separator of claim 1, wherein the helical flow-turning blades each have a variable pitch that is steeper towards the inlet of the separator housing than towards the outlet of the separator housing.

13. The flow separator of claim 1, wherein the flow diverter is positioned within the enlarged diameter portion of the flow passage at a location axially spaced form the inlet, wherein the main inner surface is cylindrical, wherein the distance is less than 25% of a transverse cross-dimension of the inlet of the separator housing.

14. A flow separator comprising:

a separator housing extending along a central axis between an inlet and an outlet, the separator housing defining a flow passage that extends through the separator housing along the central axis from the inlet to the outlet, the flow passage having an intermediate portion having a larger transverse cross-dimension than the inlet, an enlarged diameter portion of the flow passage being defined by a main inner surface of a sidewall of the intermediate portion of the separator housing;

a flow diverter disposed within the flow passage, the flow diverter having a first surface facing at least partially toward the inlet and a second surface facing at least partially towards the outlet, a bladed arrangement disposed around the flow diverter so that at least a portion of the bladed arrangement is disposed radially between the flow diverter and the separator housing, the bladed arrangement being configured to direct flow in a swirl around the flow diverter;

a swirl region disposed along the flow passage and extending downstream of the flow diverter; and a barrier wall disposed within the flow passage at an opposite end of the swirl region from the flow diverter, the barrier wall cooperating with the flow passage to define an annularly shaped particle collection space having a pathway leading outwardly away from the particle collection space;

wherein an axial distance between the particle collection space and a downstream end of the flow diverter is greater than an axial height of the flow diverter; wherein a distance is defined between a maximum outer diameter of the flow diverter and the main inner surface of the sidewall of the intermediate portion of the separator housing, and wherein the distance is between 1% and 15% of a transverse cross-dimension of the inlet of the separator housing wherein the flow diverter is positioned within the enlarged diameter portion of the flow passage at a location axially spaced form the inlet, wherein the main inner surface is cylindrical, wherein the distance is less than 25% of a transverse cross-dimension of the inlet of the separator housing, wherein the flow diverter includes a hollow interior defined by an inner surface that faces at least partially toward the outlet, and wherein the flow diverter has an open downstream end providing fluid communication between the swirl region and the hollow interior; a gas outlet mount coupled to an exterior of the separator housing, the gas outlet mount defining a gas outlet port leading to an interior of the gas outlet mount; and a conduit extending from the gas outlet mount into an interior of the separator housing, through the flow passage, and upstream towards the flow diverter, wherein the conduit extends from the gas outlet port into the open downstream end and into the hollow interior of the flow diverter.

15. The flow separator of claim 14, wherein the bladed arrangement includes a plurality of blades forming a helical flow path with a variable pitch.

16. The flow separator of claim 14, wherein the pathway leads to a sensor housing including a sensor port configured to receive a particle sensor.

17. The flow separator of claim 14, wherein the pathway leads to a collection tank configured to retain particle debris received via the pathway.

18. The flow separator of claim 17, further comprising a plug extending into an interior of the collection tank, the plug being removable to access particles stored in the collection tank.

19. The flow separator of claim 17, further comprising a return path leading downstream of the particle collection space, the return path cooperating with the pathway to produce a slipstream passing by a collection pocket.

20. A flow separator comprising:

a separator housing defining a central axis, the separator housing including a length that extends along the central axis between first and second ends of the separator housing, the first end of the separator housing defining an inlet of the separator housing and the second end of the separator housing defining an outlet of the separator housing, the inlet and the outlet being co-axially aligned along the central axis, the separator housing defining a flow passage that extends through the separator housing along the central axis from the inlet to the outlet, an enlarged diameter portion of the flow passage being defined by a main inner surface of a sidewall of the separator housing that surrounds the central axis;

a flow diverter positioned within the flow passage, the flow diverter being co-axially aligned with the central axis and including an outer surface that faces at least partially toward the inlet, the outer surface defining an outer diameter of the flow diverter that enlarges as the outer surface extends toward the outlet of the separator housing;

helical flow-turning blades positioned between the outer surface of the flow diverter and the main inner surface of the sidewall of the separator housing for causing flow moving through the flow passage toward the outlet to swirl about the central axis;

a particle collection space defined by the separator housing around the central axis adjacent the main inner surface of the enlarged diameter portion of the flow passage of the separator housing, the particle collection space having an annular shape and being located downstream of the flow diverter;

a swirl region within the enlarged diameter portion of the flow passage axially between the flow diverter and the outlet of the separator housing, wherein the particle collection space is located at a downstream end of the swirl region, wherein the helical flow-turning blades are adapted to cause flow to swirl about the central axis within the swirl region such that particles within the swirling flow are centrifugally forced radially outwardly against the main inner surface of the sidewall and are captured in the particle collection space;

a gas outlet mount coupled to an exterior of the separator housing, the gas outlet mount defining a gas outlet port leading to an interior of the gas outlet mount; and wherein the flow diverter includes a hollow interior defined by an inner surface that faces at least partially toward the outlet, wherein the flow diverter has an open downstream end providing fluid communication between the swirl region and the hollow interior; and a conduit extending from the gas outlet mount into an interior of the separator housing, through the flow passage, and upstream towards the flow diverter, wherein the conduit extends from the gas outlet port into the open downstream end and into the hollow interior of the flow diverter.

21. The flow separator of claim 20, wherein the flow diverter includes a hollow interior defined by an inner surface that faces at least partially toward the outlet, and wherein the conduit extends into an open space within the hollow interior of the flow diverter.

22. A flow separator comprising:

a separator housing defining a central axis, the separator housing including a length that extends along the central axis between first and second ends of the separator housing, the first end of the separator housing defining an inlet of the separator housing and the second end of the separator housing defining an outlet of the separator housing, the inlet and the outlet being co-axially aligned along the central axis, the separator housing defining a flow passage that extends through the separator housing along the central axis from the inlet to the outlet, an enlarged diameter portion of the flow passage being defined by a main inner surface of a sidewall of the separator housing that surrounds the central axis, the enlarged diameter portion of the flow passage having a larger diameter than the inlet, the main inner surface of the sidewall being cylindrical;

a flow diverter positioned within the enlarged diameter portion of the flow passage and separated from the inlet by an axial spacing, the flow diverter being co-axially aligned with the central axis and including an outer surface that faces at least partially toward the inlet, the outer surface defining an outer diameter of the flow diverter that enlarges as the outer surface extends toward the outlet of the separator housing;

helical flow-turning blades positioned between the outer surface of the flow diverter and the main inner surface of the sidewall of the separator housing for causing flow moving through the flow passage toward the outlet to swirl about the central axis;

a particle collection space defined by the separator housing around the central axis adjacent the main inner surface of the enlarged diameter portion of the flow passage of the separator housing, the particle collection space having an annular shape and being located downstream of the flow diverter, wherein the particle collection space is defined between the main inner surface of the flow passage and an annular particle collection wall spaced radially inwardly from the main inner surface; and a swirl region within the enlarged diameter portion of the flow passage axially between the flow diverter and the outlet of the separator housing, wherein the particle collection space is located at a downstream end of the swirl region, wherein the helical flow-turning blades are adapted to cause flow to swirl about the central axis within the swirl region such that particles within the swirling flow are centrifugally forced radially outwardly against the main inner surface of the sidewall and are captured in the particle collection space;

wherein a distance is defined between a maximum outer diameter of the flow diverter and the main inner surface of the sidewall of the separator housing;

wherein the distance is less than 25% of a transverse cross-dimension of the inlet of the separator housing;

wherein the flow diverter is positioned within the enlarged diameter portion of the flow passage at a location axially spaced form the inlet; wherein the flow diverter includes a hollow interior defined by an inner surface that faces at least partially toward the outlet, wherein the flow diverter has an open downstream end providing fluid communication between the swirl region and the hollow interior; a gas outlet mount coupled to an exterior of the separator housing, the gas outlet mount defining a gas outlet port leading to an interior of the gas outlet mount; and a conduit extending from the gas outlet mount into an interior of the separator housing, through the flow passage, and upstream towards the flow diverter, wherein the conduit extends from the gas outlet port into the open downstream end and into the hollow interior of the flow diverter.

23. The flow separator of claim 22, wherein, the inner surface defining an inner diameter of the flow diverter that enlarges as the inner surface extends toward the outlet of the separator housing.

24. The flow separator of claim 23, wherein the distance is less than 15% of the transverse cross-dimension of the inlet of the separator housing.

25. A flow separator comprising:

a separator housing extending along a central axis between an inlet and an outlet, the separator housing defining a flow passage that extends through the separator housing along the central axis from the inlet to the outlet, the flow passage having an intermediate portion including a main inner surface of a sidewall of the separator housing that surrounds the central axis, the intermediate portion of the flow passage having a larger diameter than the inlet;

a flow diverter disposed within the intermediate portion of the flow passage and separated from the inlet by an axial spacing, the flow diverter having a first surface facing at least partially toward the inlet and a second surface facing at least partially towards the outlet, a bladed arrangement disposed around the flow diverter so that at least a portion of the bladed arrangement is disposed radially between the flow diverter and the main inner surface of the intermediate portion of the separator housing, the bladed arrangement being configured to direct flow in a swirl around the flow diverter;

a swirl region disposed along the flow passage and extending downstream of the flow diverter; and a barrier wall disposed within the flow passage at an opposite end of the swirl region from the flow diverter, the barrier wall cooperating with the flow passage to define an annularly shaped particle collection space having a pathway leading outwardly away from the particle collection space;

wherein a distance is defined between a maximum outer diameter of the flow diverter and the main inner surface of the sidewall of the separator housing, and wherein the distance is between 1% and 15% of a transverse cross-dimension of the inlet of the flow separator housing;

wherein the flow diverter includes a hollow interior defined by an inner surface that faces at least partially toward the outlet, and wherein the flow diverter has an open downstream end providing fluid communication between the swirl region and the hollow interior; wherein the flow diverter has an open downstream end providing fluid communication between the swirl region and the hollow interior; a gas outlet mount coupled to an exterior of the separator housing, the gas outlet mount defining a gas outlet port leading to an interior of the gas outlet mount; and a conduit extending from the gas outlet mount into an interior of the separator housing, through the flow passage, and upstream towards the flow diverter, wherein the conduit extends from the gas outlet port into the open downstream end and into the hollow interior of the flow diverter.

26. The flow separator of claim 25, wherein an inner diameter of the inlet, an inner diameter of the outlet, and an inner diameter of the intermediate portion of the separator housing are different from each other.

27. The flow separator of claim 25, wherein an inner diameter of the intermediate portion is larger than an inner diameter of the inlet of the separator housing.

28. The flow separator of claim 25, wherein an inner diameter of the inlet is larger than an inner diameter of the outlet of the separator housing.

29. An in-line flow separator comprising:

a separator housing extending along a central axis between an inlet and an outlet, the separator housing defining a flow passage that extends through the separator housing along the central axis from the inlet to the outlet, wherein the inlet and the outlet of the separator housing are coaxial;

a flow diverter disposed within the flow passage, the flow diverter having a first surface facing at least partially toward the inlet and a second surface facing at least partially towards the outlet, a bladed arrangement disposed around the flow diverter so that at least a portion of the bladed arrangement is disposed radially between the flow diverter and the separator housing, the bladed arrangement being configured to direct flow in a swirl around the flow diverter;

a swirl region disposed along the flow passage and extending downstream of the flow diverter; and a barrier wall disposed within the flow passage at an opposite end of the swirl region from the flow diverter, the barrier wall cooperating with the flow passage to define an annularly shaped particle collection space having a pathway leading outwardly away from the particle collection space;

a sensor housing coupled to the separator housing, the sensor housing having an interior in fluid communication with the pathway, the sensor housing including a particle sensor for detecting particles received in the sensor housing from the particle collection space through the pathway;

wherein the flow diverter includes a hollow interior defined by an inner surface that faces at least partially toward the outlet, and wherein the flow diverter has an open downstream end providing fluid communication between the swirl region and the hollow interior and wherein the flow diverter has an open downstream end providing fluid communication between the swirl region and the hollow interior; a gas outlet mount coupled to an exterior of the separator housing, the gas outlet mount defining a gas outlet port leading to an interior of the gas outlet mount; and a conduit extending from the gas outlet mount into an interior of the separator housing, through the flow passage, and upstream towards the flow diverter, wherein the conduit extends from the gas outlet port into the open downstream end and into the hollow interior of the flow diverter.

30. The in-line flow separator of claim 29, wherein the particle sensor includes at least one of a pulsed electric chip detector sensor, an acoustic sensor, or an optical sensor.

31. The in-line flow separator of claim 29, wherein the inner surface of the flow diverter defines an inner diameter of the flow diverter that enlarges as the inner surface extends toward the outlet of the separator housing.

* * * * *